(12) United States Patent
Choi et al.

(10) Patent No.: US 6,928,434 B1
(45) Date of Patent: Aug. 9, 2005

(54) METHOD AND SYSTEM FOR CLUSTERING OPTIMIZATION AND APPLICATIONS

(75) Inventors: Lawrence J. Choi, Lawrenceville, NJ (US); Christopher B. Kuenne, Princeton, NJ (US); Kurt E. Holstein, II, Princeton, NJ (US)

(73) Assignee: Rosetta Marketing Strategies Group, Princeton, NJ (US)

( * ) Notice: Subject to any disclaimer, the term of this patent is extended or adjusted under 35 U.S.C. 154(b) by 969 days.

(21) Appl. No.: 09/867,801

(22) Filed: May 31, 2001

Related U.S. Application Data
(60) Provisional application No. 60/265,094, filed on Jan. 31, 2001.

(51) Int. Cl.[7] .............................................. G06F 17/30
(52) U.S. Cl. .............................. 707/6; 707/101; 705/10; 705/19; 706/48; 706/45; 706/52
(58) Field of Search .................... 707/1–10, 100–104.1, 707/200–205; 706/45, 48, 52; 705/10, 19

(56) References Cited

U.S. PATENT DOCUMENTS

| | | | | |
|---|---|---|---|---|
| 5,832,182 A | * | 11/1998 | Zhang et al. ................. | 706/50 |
| 6,003,029 A | * | 12/1999 | Agrawal et al. ............... | 707/7 |
| 6,374,251 B1 | * | 4/2002 | Fayyad et al. ............... | 707/101 |
| 6,615,205 B1 | * | 9/2003 | Cereghini et al. ............ | 707/3 |
| 6,745,184 B1 | * | 6/2004 | Choi et al. ................... | 707/6 |
| 2002/0013752 A1 | * | 1/2002 | Johnson et al. ............... | 705/36 |
| 2003/0110112 A1 | * | 6/2003 | Johnson et al. ............... | 705/36 |

OTHER PUBLICATIONS

Trindade, David, Survey Data: Use of Scatter Plots for Displaying Scale and Consistency Factorse, Proceeding of The Survey Research Methods Section, American Statistical Association, 1995, pp. 99–101.*

Johnson et al. "Effects of Question Context and Response Order on Attitude Questions", Proceedings of The Survey Research Methods Section, American Statistical Msociation, 1998, pp. 857–860.*

* cited by examiner

*Primary Examiner*—Mohammad Ali
(74) *Attorney, Agent, or Firm*—Michael Haynes PLC

(57) ABSTRACT

A computer-assisted method for determining a plurality of clusters is disclosed. The disclosed method includes, for each of a plurality of observations, obtaining a data set containing no more than one proxy value for each of a plurality of variables, each variable having a plurality of possible values. The disclosed method also includes, assigning each of the plurality of observations to one of a plurality of clusters, and, for the plurality of observations and the plurality of variables, via cluster reassignment, maximizing a processor-determined fitness score representing a number of variables from the plurality of variables for which each observation's proxy value corresponds to a mode for that observation's assigned cluster.

38 Claims, 16 Drawing Sheets

Method 5 - Segmentation-on-the-Fly

Method 1 - Babbitt Score

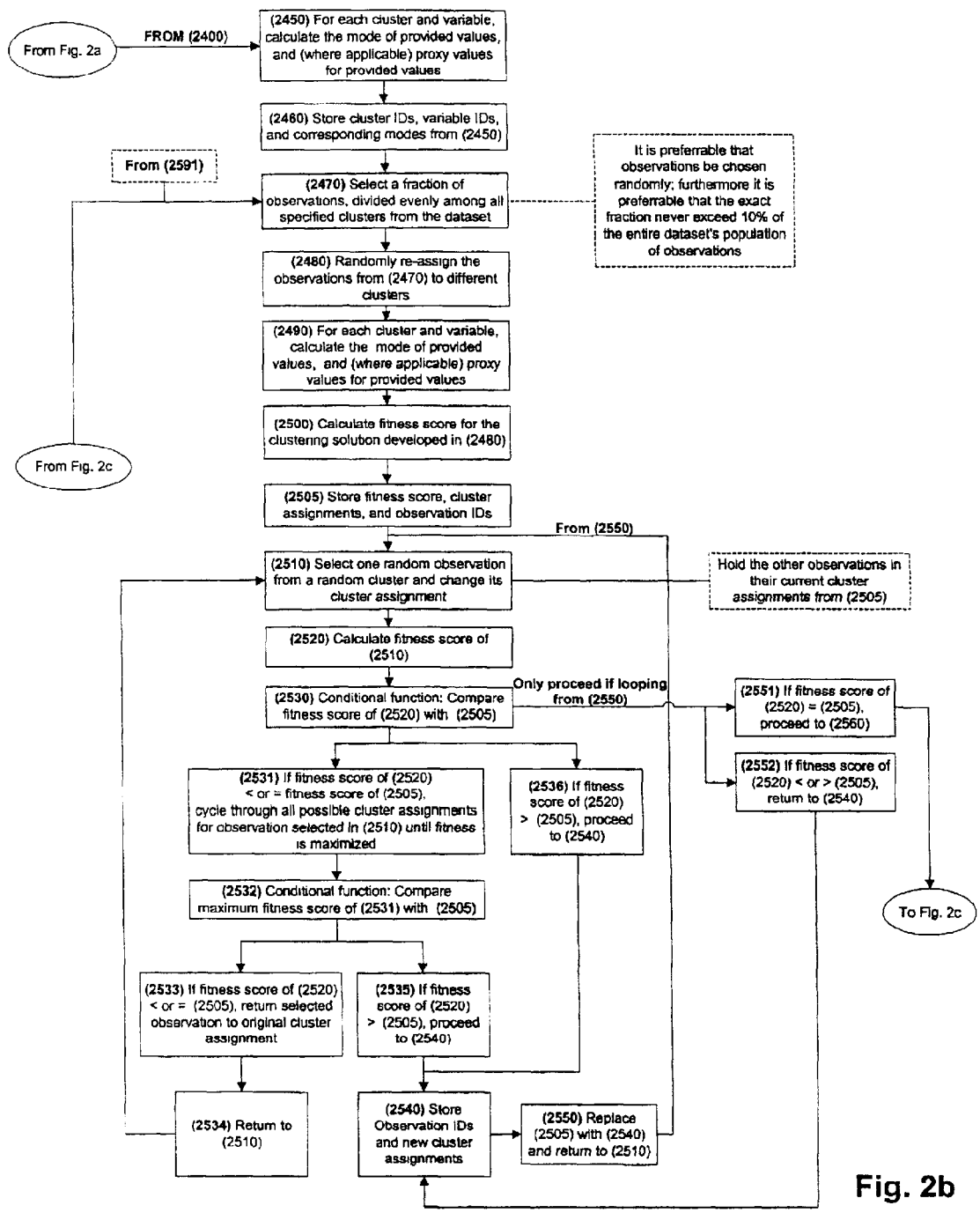

Method 2 - Bestfit Clustering - Continued

Method 3 - Champion/Challenger Clustering Refinement

Method 5 - Segmentation-on-the-Fly

Method 5 - Segmentation-on-the-Fly - Continued

Method 5 - Segmentation-on-the-Fly - Continued

Method 6 - Behavioral Segment Scoring

Method 6 - Behavioral Segment Scoring - Continued

Method 7 - Panel Analysis

Information Device 9

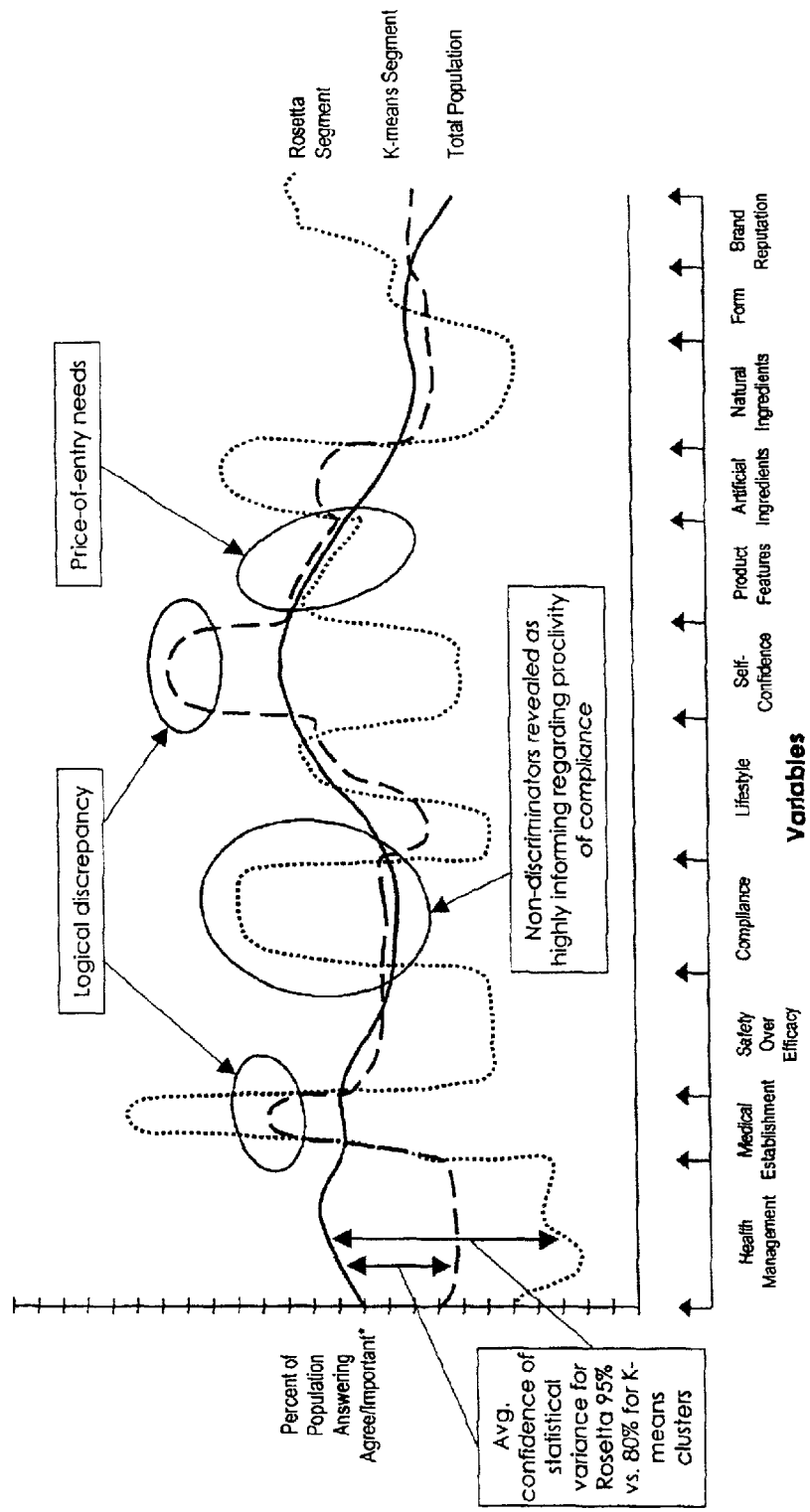

METHOD AND SYSTEM FOR CLUSTERING OPTIMIZATION AND APPLICATIONS

CROSS-REFERENCE TO RELATED APPLICATION

This application relates to, claims priority to, and incorporates by reference herein in its entirety, the following pending U.S. patent application:

Ser. No. 60/265,094, titled "Rosetta Methods", filed Jan. 31, 2001.

This invention relates to and incorporates by reference herein in their entirety, the following pending U.S. patent applications:

Ser. No. 09/867,800, titled "Method and System for Clustering Optimization and Applications", filed 31 May 2001.

Ser. No. 09/867,804, titled "Method and System for Clustering Optimization and Applications", filed 31 May 2001.

Ser. No. 09/867,802, titled "Method and System for Clustering Optimization and Applications", filed 31 May 2001.

Ser. No. 09/867,803, titled "Method and System for Clustering Optimization and Applications", filed 31 May 2001.

Ser. No. 09/867,582, titled "Method and System for Clustering Optimization and Applications", filed 31 May 2001.

FIELD OF THE INVENTION

The present invention relates at least to the field of statistics, and, more particularly, to a method and system for clustering optimization and applications.

BRIEF DESCRIPTION OF THE DRAWINGS

The invention will be more readily understood through the following detailed description, with reference to the accompanying drawings, in which:

FIGS. 2a, 2b, and 2c are a flowchart of an exemplary embodiment of a method 2 of the present invention.

FIG. 11 is a chart for an actual blinded case study that plots survey variables against the percent of the surveyed population who agreed with a survey variable or indicated that the survey variable was important.

DETAILED DESCRIPTION

Introduction

Figure 1:
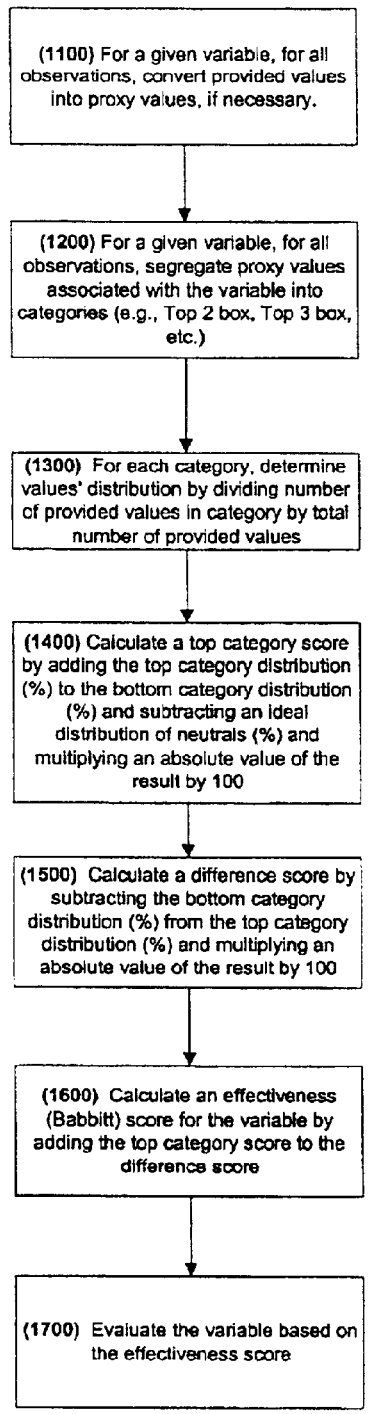
FIG. 1 is a flowchart of an exemplary embodiment of a method 1 of the present invention.

The combination of Wall Street pressure to accelerate earnings growth and an ever-increasing fragmentation of consumer preferences and media habits has created a strategic imperative for businesses to identify and understand a panoply of consumer product and service choices through marketing tools and frameworks, most notably customer segmentation.

Traditional approaches to segmentation have at least the following three fundamental flaws:

1. The segments are not truly distinct from one another against a common set of variables. This lack of distinctiveness obscures the resolution of each segment and the overall structure.
2. The needs and attitudes of a segment do not logically align with purchase behaviors.
3. Each segment cannot be isolated and targeted from within the general population.

Embodiments of methods and systems of the present invention can solve each of these three flaws through a unique and distinctive set of business processes and econometric modeling techniques and thereby provide businesses with the ability to create breakthrough marketing initiatives. Moreover, these inventive processes and techniques can be extended to solve numerous problems outside of the fields of marketing and business.

Why the Rosetta Inventive Method Works

Rosetta's inventive methodology combines two seemingly disparate disciplines, microeconomics and psychology, under the backdrop of econometrics.

Microeconomics teaches that purchase and sales behaviors are logical, rational, and predictable, but provides no insight into the customer beliefs that drive brand choice.

Psychology teaches that a finite set of personality types exist in a given population but provides no insight into the decision rules that lead to brand choice.

Econometrics provides the quantitative and analytic rigor needed to identify the finite sets of personalities each with unique and predictable purchase/sales behavior patterns and decision rules.

The Rosetta Segment-Based Marketing System combines and provides the benefits of the insights of economics and psychology in a quantitatively rigorous framework with rapidly actionable applications.

The Rosetta Difference

Rosetta's unique segmentation process, beginning with data collection and culminating in clustering optimization, advantageously defines segments that are collectively more differentiated and individually more homogeneous than those developed using previous industry best practices.

An example of these improved segments is shown in FIG. 11, which plots survey variables against the percent of the surveyed population who agreed with a survey variable or indicated that a survey variable was important. FIG. 11 reflects an actual blinded case study for a over-the-counter medication, and charts the Rosetta Segmentation Process against a K-means segmentation and against the responses of the total population. The responses have been normalized for similar variables with opposite wording/phrasing. In other words, for a variable in which the only possible responses are "agree", "neutral", and "disagree", whereas if 30% of a particular population agrees with the statement, "I hate zebras" and 25% of that same population is neutral toward zebras, then, logically, the remaining 45% of that population must not hate zebras (i.e. 45% agree with the statement "I LIKE zebras").

The solid line of FIG. 11 indicates the response distribution for the total population of individuals that responded to a survey on over-the-counter medication. The dotted line indicates the response distribution for the same survey of a Rosetta segment whose constituents represent a sub-set of the total population. The heavy dashed line indicates the response distribution for the same survey of a k-means generated segment whose constituents represent a sub-set of the total population. All three lines were calculated using the same methodology. For each variable in the survey, the number of individuals in a group that responds "agree/ important" to a variable is divided by the total number of individuals in the group that responded to the variable. In this way, the response patterns for the total population, a Rosetta segment, and a k-means segment can be graphically arrayed and evaluated.

An important criterion for evaluating a segmentation solution is determining whether response patterns for generated clusters are statistically different from the response pattern of the overall population of respondents. As call-out box 1 of FIG. 11 shows, the average calculated confidence that the Rosetta segment is statistically different from the overall population is 95%, while the k-means segment only has an average calculated confidence of statistical variance of 80%. This finding demonstrates that Rosetta's segmentation approach yields segments that are vastly more distinctive from the general population than k-means segments. This finding also necessarily reveals that Rosetta's segments have a higher degree of internal homogeneity (i.e. each Rosetta segment has a greater proportion of similarly responding observations than k-means segments).

Another important criterion for evaluating segmentation structures is logical consistency. In call-out box 2, the k-means segment is revealed to have a logical discrepancy. For variables that probe a respondent's reliance on the medical establishment (i.e. physicians, pharmacists, nurses), the k-means segment indicates that the segment agrees with being reliant on the medical establishment for treating illnesses. Logically, the same k-means segment should disagree with variables that indicate self-reliance for treating illnesses. However, the same k-means segment strongly agrees with the self-reliance for treating illnesses variables. The Rosetta segment is, in contrast, logically consistent because it agrees with being reliant upon the medical establishment for treating illnesses and disagrees (i.e. very few segment members agree) with being self-reliant for treating illnesses.

An additional advantage of the Rosetta segmentation approach is that more variables are revealed as informative regarding each segment's beliefs toward a particular concept. If a segment's response distribution for a set of variables closely mirrors that of the total population, the variables in question are generally dismissed as either non-discriminating (because there is no statistical variance from the overall population) or as price of entry (i.e. a concept to which so many individuals in the population respond identically that the concept is considered an existential to the market in question).

Rosetta's approach, however, reveals variables to be discriminating where other approaches, such as k-means clustering, fail. Call-out box 3 reveals how response to variables related to patient compliance with physician instructions (e.g. "get more bed rest", "drink more fluids", "take medication for 10 days") are not statistically different from the total population for the k-means segment. These variables would normally be ignored as non-discriminating or dismissed as price-of-entry. Rosetta's approach reveals that these compliance variables are indeed highly discriminating in defining the segment. In addition, it makes sense logically for Rosetta's segment to agree with being reliant on the medical establishment for treatment AND to agree with variables relating to compliance. However, price-of-entry variables do exist in virtually all market categories (e.g. in carbonated sodas, "my soda needs to be carbonated", is price-of-entry). A segmentation structure that discovers NO price-of-entry variables is suspect. Call-out box 4 is an example of where the Rosetta approach has indeed discovered some price-of entry variables related to product features.

Overview

The Rosetta Segment-based Marketing Process includes several inventive techniques that are disclosed herein. They include:

I. Babbitt Score
II. Bestfit Clustering
III. Champion/Challenger Clustering Refinement
IV. Composition Analysis
V. Segment-on-the-Fly
VI. Behavioral Segment Scoring
VII. Panel Analysis
VIII. The Overall Segment-Based Marketing Process A description of marketing-oriented applications for each of these techniques follows, the description including background information, a brief problem statement, a brief solution statement, a discussion of the impact and/or other applications for the technique, and finally, a brief description of the methodology of the technique. Following these descriptions of these techniques as applied to marketing, a description of flowcharts showing exemplary embodiments of the techniques as applied more generally is provided.

Throughout these descriptions, several terms are used synonymously. For example, the term "segment" is synonymous with the term "cluster", which is a grouping of similar observations. Likewise, the term "clustering structure" is a synonym for "clustering solution", either of which are a finite set of clusters for a dataset, with, in some cases, constituents that are mutually exclusive and collectively exhaustive ("MECE").

Also, the term "respondent" is synonymous with the term "observation", which can be viewed as a record (or row) in a dataset for which values are recorded for a particular variable. Further, the term "question" is synonymous with the term "variable", either of which can be viewed as a field (or column) in a dataset, the field having a recorded value for each observation. Moreover, the term "possible answer" is synonymous with the term "possible value", and the term "provided answer" is synonymous with the term "provided value".

I. Babbitt Score

A. Description

1. Background: One component of the overall clustering process, described infra, is the survey piloting process. One objective of the survey pilot is to identify the subset of questions within a larger survey that are most discriminating. These questions are then used in the full-enumeration study. The current best practices involve identifying and removing price-of-entry variables from the data collection process. A price-of-entry variable is defined as a variable to which >80% of the survey's population responds identically.

2. Business Complication: Although price-of-entry variables generally consist of about ≦20% of a pilot's total questions, this analysis does not eliminate enough questions from the data collection process. Furthermore, variable analysis beyond identifying price-of-entry can be a heuristic and arbitrary process not grounded in empiricism. The concern is that effective variables could be eliminated, and/or unproductive variables could be retained.

3. Solution: The bulk of variables used in the data collection process require either agree/neutral/disagree or important/no opinion/unimportant responses in 5 or 7 point scales. Statistical testing using standard techniques (e.g., chi-squared analysis) of historical work by the inventors revealed that the variables that were most predictive of segments had response distributions of about 25% agree/important, 50% neutral/no opinion, 25% disagree/unimportant.

B. Impact/output

This technique provides a standardized method, rooted in empiricism, for efficiently calculating a survey question's potential effectiveness. Based on score magnitude a question is either retained, subjected to additional analysis, or eliminated.

| Babbitt Score | Evaluation |
|---|---|
| ≤50 | Keep |
| 50 < x ≤ 100 | Further Analysis |
| >100 | Eliminate |

C. Methodology/components

1. Group question responses (indicated here by numbers from 1–5 and 1–7) into either Top 2 Box or Top 3 Box:

Top 2 Box

| Response | 5-Point Scale | 7-Point Scale | Description |
|---|---|---|---|
| Agree/Important | 1, 2 | 1, 2 | Top 2 Box |
| Neutral/No Opinion | 3 | 3, 4, 5 | Middle 1 or 3 |
| Disagree/Unimportant | 4, 5 | 6, 7 | Bottom 2 Box |

Top 3 Box

| Response | 7-Point Scale | Description |
|---|---|---|
| Agree/Important | 1, 2, 3 | Top 3 Box |
| Neutral/No Opinion | 4 | Middle |
| Disagree/Unimportant | 5, 6, 7 | Bottom 3 Box |

2. Calculate Response Distributions
   a. #Agree/Important÷Total Population
   b. #Neutral/No Opinion÷Total Population
   c. #Disagree/Unimportant÷Total Population 3. Calculate Top Box Score $$\text{Top Box Score} = \left| \begin{array}{c} \text{Top Box} \\ \text{Response} \\ \text{Percent} \end{array} + \begin{array}{c} \text{Bottom Box} \\ \text{Response} \\ \text{Percent} \end{array} - x \right| \cdot 100$$

Where x=ideal response distribution for a "neutral/no opinion," the inventors have found that 50% works well 4. Calculate Difference Score $$\text{Difference Score} = \left| \begin{array}{c} \text{Top Box} \\ \text{Response} \\ \text{Percent} \end{array} - \begin{array}{c} \text{Bottom Box} \\ \text{Response} \\ \text{Percent} \end{array} \right| \cdot 100$$

5. Calculate Babbitt Score
   Babbitt Score=Top Box Score+Difference Score

The Babbitt Score process steps are easily executed in a spreadsheet or database and does not require any proprietary software.

II. Bestfit Clustering

A. Description

1. Background: High-resolution segmentation can be considered to be an important aspect of the inventors' business methodology. Currently, the standard clustering approaches available in all major statistical packages (e.g. SAS, SPSS, S-Plus) is the k-means clustering algorithm, conjoint analysis, and correspondence analysis.

2. Business Complication: Standard clustering approaches are incompetent, because they achieve neither a reasonable level of discrimination within a common set of variables across segments, nor a reasonable level of homogeneity within each segment, which the inventors call level of resolution. "Resolution" is defined in part C of this section.

3. Solution: The inventors have developed a segmentation methodology, Bestfit clustering, that accomplishes the 4 objectives listed in Section B2 (below). Bestfit clustering is a segmentation algorithm that maximizes "fit" as the (weighted) number of questions for which a respondent's answers correspond to the mode of responses of that particular respondent's segment.

B. Impact/output

1. Bestfit clustering generates a segmentation solution that within the specified constraints maximizes "fit". These constraints are:
   Number of segments in final solution set (required)
   Number of iterations (required)
   Presence of an initial segmentation solution to be optimized (optional)
   Whether to conduct a systematic search (optional)
   Whether to conduct thorough search (optional)
   Variable weights (optional)

These components will be described in greater detail in the next section of this description.

2. By maximizing "fit," Bestfit clustering creates a high-resolution segmentation solutions required to power the inventors' business methodology. The inventors define high-resolution segmentation as a clustering process that accomplishes all of the following objectives:
   a. Maximize inter-segment heterogeneity and discrimination
   b. Maximize intra-segment homogeneity
   c. Yield segments defined by logically connected beliefs
   d. Yield segments whose beliefs are correlated with brand choice C. Examples:
   a. Inter-segment heterogeneity and discrimination: Segments in the solution set are as distant from each other as possible because response distributions are largely unique by segment (e.g. doctor directed segment should be heavily "overdeveloped" in comparison to the total population in agreeing with "I seek medical advice" while a self-reliant segment should be very "underdeveloped" in agreeing with that same belief statement). The inventors use conventional "index" definitions and standards in determining segment development versus the overall population. An "index" is calculated on a response-specific basis (i.e. calculated for agree, neutral and disagree).

The index is calculated by dividing the segment X response percent for question Y by the total population response percent for question Y, and multiplying the result by 100.

An index $\geq 120$ is considered to be "overdeveloped" and an index of $\leq 80$ is considered to be "underdeveloped."

b. Intra-segment homogeneity: Segments in the solution set must be internally consistent. There are 2 standards the methods of the present invention look for:

Non-conflicting responses (e.g. a doctor-directed segment should agree with "I seek medical advice" and disagree with "I don't trust doctors").

Minimal bimodality in question-response distributions.

c. Logically connected beliefs: One way to logically define a MECE (mutually exclusive, collectively exhaustive) segmentation structure is to compare the constituent segments across a common set (or stub) of variables. This comparison ensures that it is possible to understand category, macro-segment, and sub-segment dynamics through an inductive or deductive evaluation of question-response distributions along common measures.

d. Beliefs correlated with brand choice: A segment with a specific belief structure should have an overdevelopment in consumption and/or usage of brand(s) whose current brand equities are aligned with that segment's specific belief structure. The primary measures of consumption and/or usage are: brand penetration, brand share, and brand volume. Penetration is a measure of how many individuals in a given population have actually purchased and/or used a brand, product, or service within a category. Share is a measure of a particular brand's "ownership" (i.e. proportion) of the total category purchase and/or usage as compared with competing brands. Volume is a measure of how much a particular individual within a category consumes of a specific brand, product, or service. The following examples of each measure are for the analgesic category. It is important to note that although the terminology used here is CPG-oriented, analogues of these measures apply across industries (including service-oriented industries such as retail banking and technology industries such as computer equipment manufacturers).

Penetration: A segment that does not believe in medicating should have a significantly lower incidence of purchasing and/or using analgesic medicines than a segment that believes in aggressively medicating even the smallest ailment.

Share: The same aggressive medicating segment should have a much higher share of brands that contain the ingredients that are known for performance efficacy (i.e. ibuprofen, naproxen sodium). In contrast, a segment that is safety-oriented should have a much higher share and usage of ingredients known for their safety (e.g. acetaminophen).

Volume: A quantifiable measure of how much of a brand a consumer purchases/uses in a given time period. Units of measure include dollars spent and volumetric level (e.g. # of tablets, ml of liquid). Variables that measure volume can be calculated in 2 ways: self-reported (i.e. survey respondent estimates volume) and panel-derived (i.e. a survey respondent is a member of a tracking panel such as IRI or AC Nielsen so his/her volume can be calculated). For example, the same aggressive medicating segment should spend more dollars and/or consume more pills within the category and within brands aligned with its belief structure than a non-medicating segment.

C. Methodology/components

1. Fundamental Methodology

Let i (where i={1, ... n}) denote each individual (i.e. data observation) within the clustering population, and let s(i) be the assigned cluster for i. If q(k,l) denotes i's answer to question k (where k={1, ... k}), then group the data observations (i) into s segments (predefined constraint) in order to maximize the following:

$$\sum_{i=1}^{n}\sum_{k=1}^{K} w(k) \cdot 1\left(q(i,k) = \underset{j}{\mathrm{argmax}}\left\{\sum_{l:s(l)=s(i)} 1(q(l,k)=j)\right\}\right) \quad (1)$$

Where 1(A) is an "indicator function" that equals 1 if A is true, and 0 if A is false, and w(k) is the weight for question k.

$$\text{Note: } A = \left(q(i,k) = \underset{j}{\mathrm{argmax}}\left\{\sum_{l:s(l)=s(i)} 1(q(l,k)=j)\right\}\right)$$

2. The initial segmentation solution (i.e. the starting point that will be optimized in terms of (1) in successive iterations) can be developed using 1 of the following 3 methods.

a. Use a pre-existing segmentation solution and group data observations accordingly (this capability is the core of technique III, Champion/Challenger Clustering Refinement).

b. Systematic search

For each pair of questions ($k_x$, $k_{x+y}$) the segmentation that best describes those 2 questions using the specified number of segments is found. To do this maximize:

$$\sum_{i=1}^{n}\left[w(k_x) \cdot 1\left(q(i,k_x) = \underset{j}{\mathrm{argmax}}\left\{\sum_{l:s(l)=s(i)} 1(q,(l,k_x)=j)\right\}\right) + \right.$$

$$\left. w(k_{x+y}) \cdot 1\left(q(i,k_{x+y}) = \underset{j}{\mathrm{argmax}}\left\{\sum_{l:s(l)=s(i)} 1(q,(l,k_{x+y})=j)\right\}\right)\right]$$

This will result in $[K \cdot (K-1)] \div 2$ segmentation solutions. The fit defined in (1) is calculated for each segmentation solution. The initial segmentation is the one that maximizes (1).

c. Thorough Search: For each question, k, the segmentation that best describes k is found. To execute this, maximize for each k:

$$\sum_{i=1}^{n} w(k) \cdot 1\left(q(i, k) = \underset{j}{\operatorname{argmax}}\left\{\sum_{\{s(l)=s(i)\}} 1(q, (l, k) = j)\right\}\right)$$

This will result in generating K segmentation solutions. Then let k* denote the question that results in a segmentation solution that maximizes (1). For each question other than k*, the segmentation solution that best describes that question and the k*-th question is found. Then maximize:

$$\sum_{i=1}^{n}\left[w(k^*) \cdot 1\left(q(i, k^*) = \underset{j}{\operatorname{argmax}}\left\{\sum_{\{s(l)=s(i)\}} 1(q, (l, k^*) = j)\right\}\right) + \right.$$

$$\left. w(k) \cdot 1\left(q(i, k) = \underset{j}{\operatorname{argmax}}\left\{\sum_{\{s(l)=s(i)\}} 1(q, (l, k) = j)\right\}\right)\right]$$

Of the K segmentation solutions, the one that maximizes (1) is used as the starting point for segmentation.

3. Once a segmentation solution is defined, an attempt to improve "fit" is executed by:
   a. Randomly change the segmentation for a random fraction, $\theta$, of the clustering data set
   b. Then reassign segment membership for each data observation (while keeping all other data observations at their current segment assignments). Each time s(i) changes for i, fit is calculated [cf. (1)]. This process is continually repeated until changing s(i) for i (while keeping all other data observations at their current memberships) does not improve "fit" [cf. (1)]. The objective is to find a segmentation solution whose "fit" cannot be improved by reassigning only one data observation. Finding such a solution constitutes 1 iteration.
   c. If the fit of the solution discovered in the completed iteration surpasses the fit of the segmentation solution used to begin that iteration, the new solution is used as the launching point for the next iteration.
   d. The corollary of 3.c is true
   e. $\theta$ is defined as $P(\theta \leq x) = \bar{x}$ for $x \in (0,1)$
   This ensures that small values of $\theta$ are more likely than large values.

This series of steps is easily executed using Fortran, Gauss, SAS, or any other language with extensive mathematical functionality.

III. Champion/challenger Clustering Refinement
   A. Description
   1. Background: At a fundamental level, segmentation is an attempt to increase the effectiveness of marketing strategy and tactics by either reducing the number of unique marketing targets from n (i.e., all individual customers/prospects) to a manageable and actionable subset of finite marketing targets or by increasing the number of targets from one group, in which all customers/prospects are treated alike
   2. Business Complication: The conventional approach to clustering does not build segmentation structures cumulatively (i.e. identifying the optimal solution by using a previous "winning" segmentation as launch point for further clustering analysis) but begins each new cycle of cluster analysis by creating a new segmentation structure. This lack of analytic continuity is problematic because developing the optimal solution ends up being more a function of serendipity that the result of a methodical and measured process leading to the optimal solution.
   3. Solution: The inventors have proven that there is a process for making segmentation scheme evaluation and refinement more systematic, efficient, and most importantly, more commercially valuable to the marketer, as defined by the breakaway business results achieved using the inventors' approach versus the conventional approach.
      a. The over-arching philosophy requires a Darwinian evaluation process of segmentation solutions. Once a "champion" emerges, it becomes the standard against which subsequent analyses are to be evaluated. If one of these "challengers" outperforms the current "champion" in any of the 4 metrics discussed in section II and is not worse in the remaining 3 metrics, that "challenger" then becomes the new "champion." This process is continued until no new "challengers" win after 2 rounds of analysis subsequent to the creation of the current "champion."
      b. The inventors' clustering process is predicated upon "evolving" solutions superior to their progenitors. A possible input to the inventors' clustering process is a pre-defined segmentation solution that is used as the analytic starting point.
   B. Impact/output
   1. This invention creates a systematic process for evaluating segmentation solutions. Although it cannot completely eliminate the "art" aspect of the analytic process, it does force a measure of discipline into the overall analytic process and an evaluation standard rooted in empirical comparisons rather than "intuition" and "guess-work."
   2. More importantly, this invention allows the user to refine a "champion" segmentation solution by using that actual solution as the starting point. As a result, the impact of data changes (e.g. removing/adding data observations, weighting variables, removing/adding variables) to that "champion" segmentation scheme (i.e. improvement or degradation by the inventors' 4 standards) can be addressed with absolute certainty. Because other segmentation methods do not allow for this "common denominator," it is impossible to empirically evaluate how a segmentation structure has changed using those methods.
   3. Finally, this invention reduces the time that needs to be allocated to cluster analysis. If a particular dataset is yielding good results but needs to be tested on more iterations, rather than having to increase the total number of iterations, the "champion" solution allows a "credit" of iterations that reduces the time required. For example, if the stability of a winning solution needs to be confirmed by running twice as many iterations (to determine if the solution changes), this technique allows a "credit" of iterations because the launch point is the winning solution.

|  | Cycle N | Cycle N + 1 |
| --- | --- | --- |
| Conventional | 1,000 iterations | 3,000 iterations required |
| Winning solution | | 3,000 iterations executed |

-continued

|  | Cycle N | Cycle N + 1 |
|---|---|---|
| The inventors | 1,000 iterations Winning solution | 3,000 iterations required 2,000 iterations executed |

C. Methodology/components

The work steps required to execute this invention are identical to the Bestfit clustering process. The only difference is that rather than using a systematic or thorough process for determining a launching point, this technique builds on a previously identified solution.

IV. Composition Analysis

A. Description

1. Background: Any segmentation has the following caveats:
    a. Did each individual answer the questions logically and truthfully or did he or she respond randomly/deceptively/disingenuously?
    b. Was an individual assigned to his segment through serendipity?
    c. If an individual was not assigned to his segment through serendipity, how representative (or aligned) with that segment is he?
    d. Is the final number of segments in the segmentation structure the optimal number?

2. Business Complication: In order to maximize the effectiveness of product positioning, advertising, media placement, and promotions at the segment level, the marketer must be able to conduct research that tests each of the aforementioned marketing tactics within a group of segment members who exemplify the segment. When executing this type of segment-based market research, it is important to be able to eliminate from the research process consumers who do not exemplify their assigned segments. Moreover, because segmentation by definition requires that all respondents in the analytic population be assigned to a segment, the conventional approach does not differentiate between segment members who truly exemplify their segments from those who do not. This lack of clarity is one of the chief obstacles preventing segmentation from progressing to actionable and successful segment-based strategies and tactics.

3. Solution:
    a. The inventors' invention is based on the fact that each observation must be evaluated using the following criteria:
        What fraction of questions answered by each respondent corresponds to the respective segment's response modes?
        What is the probability that an individual is a "typical" member of this segment?
        What is the probability that the individual belongs in each of the segments of the segmentation solution?
    b. Based on these criteria, a segment member can be classified into one of 3 groups:
        Exemplars: An individual close to the core of a segment. This person has "high" scores for all 3 criteria discussed above
        In-Betweeners: An individual "between" 2 or more segments. Generally the probabilities of being in those segments are comparable
        Outliers: An individual who is not a "typical" member of his assigned segment and is also "between" 2 or more segments.

The specific ranges that mark each "group" vary widely by category, industry, and even line of business. Therefore, it is up to the judgment of the person conducting this analysis to calibrate the results accordingly.

B. Impact/output

This invention provides a quantitative method for efficiently evaluating the "quality" of each segment member as described above. Direct applications of this invention include:
    a. Greater precision in creating gains charts, which are used to define how deep on a target list a direct mail campaign should be mailed
    b. Superior market research (e.g. ability to observe quintessential segment members in focus groups and recruit them in qualitative research testing as described above)
    c. The ability to remove people who "randomly" answer surveys from the analytic population
    d. An enhanced understanding of truly "distinct" segments (e.g. a segment whose members are largely "In-Betweeners" and/or "Outliers" is a less attractive marketing target because it will be much harder to identify mathematically)
    e. Evaluate the quality of the segmentation structure. If a segment is heavily populated with in-betweeners, it is probably a blend of 2 or more segments. This knowledge enables an empirical decision rule for increasing/decreasing the number of segments specified when clustering.

C. Methodology/components

1. Establish Response-question Probabilities
    a. For a question, k that has $L_k$ possible answers, the probability (also known as "purposeful probability") that answer value l is selected by observations (e.g. survey respondents) in segment m is estimated by $$\hat{P}_m(k, l) = \frac{N_m(k, l)}{N_m}(1 - \delta \cdot L_k) + \delta \quad (2)$$

where
$N_m$=total number of observations in segment m
$N_m(k, l)$=the number of observations in segment m that gives the l-th answer to question k $$\delta = \min\left\{0.02, \frac{1}{2L}\right\}$$

b. If $\delta=0$, then $P_m(k, l)$ is the fraction of observations in segment m that provides answer value l to question k. To a certain extent, $\delta=0$ is optimal but results in values that are far too precise for any practical use. The value for $\delta$ used by the inventors is a more conservative factor that was derived through empirical experimentation.

2. Execute the following statistical analyses:
    a. Percentage of questions answered correctly:
        This is quite simply the percent of questions answered by a specific respondent that corresponds to the response modes of that person's segment.
    b. Probability-based Score:

This calculation helps determine if a given individual is a "typical" member of his/her segment. A person assigned to this segment who "purposefully" selected his responses should have probabilities described by $P_m(k, l)$. A person assigned to this segment through serendipity (i.e. randomly answered a certain number of questions that happened to place that person into a particular segment) has probabilities (also known as "serendipity probabilities") described by $$\frac{1}{L_k}.$$

The score is calculated by taking the log of the ratio of:
  The probability of observing the answers actually in the dataset, if the probabilities of answering are $P_m(k, l)$ to
  The probability of observing the answers actually in the dataset, if the probabilities of answers are $$\frac{1}{L_k}$$

c. Segment membership probability score:
  Suppose that $P_m(k, l)$ truly represents the probability that an individual in segment m responds answer value l to question k
  Suppose that (before the individual answers any questions) that s/he is equally likely to belong to each of the segments
  Observing that individual's answers illuminates the probability that that individual belongs in each particular segment
  Use the well-known Bayes' Theorem to calculate the probability of that individual belonging to each segment, conditional on his answers.
    Bayes' Theorem is:
    Let $A_1, A_2 \ldots, A_k$ be a collection of K mutually exclusive and exhaustive events with $P(A1)>0$ for $i=1 \ldots, K$. Then for any other event B for which $P(B)>0$ $$P(A_j/B) = \frac{P(A_j \cap B)}{P(B)} = \frac{P(B/A_j)P(A_j)}{\sum_{i=1}^{K} P(B/A_i) \cdot P(A_i)}$$

where $j=1, \ldots, K$
  In this case, let $Z_{ik}$ be the answer value that individual i gives to question k so that $$P(\text{Segment for individual } I = m \mid \text{answer}) = \frac{\prod_{k=1}^{K} \hat{P}_m(k, Z_{ik})}{\sum_{j=1}^{M} \prod_{k=1}^{K} \hat{P}_j(k, Z_{ik})}$$

All 3 statistical analyses can easily be executed using any statistical software package or programming language with extensive mathematical functionality.
3. From the results of the statistical analyses, each segment member can be classified, and the quality of the segmentation structure can be assessed.

V. Segment-on-the-fly
  A. Description
    1. Background: In order to translate the insights derived from a segmentation scheme into marketing initiatives, the marketer must have a process to accurately identify and propel customers and prospects into their correct segment. A number of techniques exist for developing and executing this process (commonly known as "typing tools"):
      CHAID/CART (tree analysis)
      Regression analysis
      Fischer Discriminant Analysis
      Neural networks
    2. Business Complications: However, many marketing strategies powered by segmentation often fail or yield disappointing results because practitioners have not been able to accurately "score" enough customers/prospects into their appropriate segments. The primary root causes of failure are as follows:
      Accuracy: Typing tools often misclassify customers/prospects thereby rendering segment-based strategies and tactics ineffective
      Coverage: Typing tools accurately identify customers/prospects but sacrifice breadth in order to achieve that accuracy
      Efficiency: Typing tools often require so many questions to achieve sufficient accuracy that they are impractical because customers/prospects will be unwilling to take the time necessary to answer a lengthy set of questions
      Flexibility: An inability to explicitly control the trade-off between accuracy and coverage or vice versa.
    3. Solution: The inventors have developed a process of question reduction that, when applied to a high-resolution segmentation structure, typically yields fewer than 15 questions that achieve the following 4 criteria:
      Small number of questions used
      High level of marketing coverage for target segments meets statistical/tactical objectives
      High level of marketing accuracy for target segments meets strategic/tactical objectives
      Overall score for solution is $\geq 70\%$.
    4. Definitions:
      a. Marketing coverage: The percent of people in each actual segment that are classified into the correct "predicted" segment
      b. Marketing accuracy: The percent of people in each "predicted" segment that are actually in that specific segment
      c. Overall score: The percent of the entire analytic population whose "predicted" segments are identical to their actual segments
  B. Impact/output
    1. The inventors' process for creating typing tools achieves a level of accuracy and coverage that is superior to conventional approaches
    2. The inventors' process for developing segment-typing tools allows the marketer to explicitly control the trade-off between accuracy and coverage depending on the application by executing the following:
      a. To maximize marketing coverage of specific segments, assign those segments weights >1
      b. To maximize marketing accuracy of specific segments, assign those segments weights <1.
    3. The output of the inventors' scoring methodology consists of an algorithm of constants and betas (i.e.

coefficients of regression). Unlike tree analysis, which involves tabulating burdensome question pathways, this output can be efficiently executed within a database or spreadsheet to score N customers.

C. Methodology/components

1. Construct an approximation of the segmentation structure (i.e., a "simpler" segmentation) using a subset of questions based on a given set of K questions
   a. Create a dummy variable for each segment so that if there are M segments, then M variables are created for each individual
   b. Mathematically, execute the following process per individual:

$$Y_{im} = \begin{cases} 1 & \text{if individual } i \text{ belongs to segment } m \\ 0 & \text{otherwise} \end{cases}$$

c. Create a dummy variable for each answer to each question so that if there are $L_k$ possible answers to question k, then $L_k$ variables are created for that question per individual
   d. Mathematically execute the following process per individual $$X_{ilk} = \begin{cases} 1 & \text{if individual } i \text{ gives the } l\text{-th answer to question } k \\ 0 & \text{otherwise} \end{cases}$$

e. For each segment m, $Y_{im}$ is regressed using ordinary least squares on $\{1, \{\chi_{ilk}: k\epsilon K, 1\leq l \leq L_k-1\}\}$
   This step will give a linear approximation to the probability that a person with a particular set of answers to question set K belongs to segment m
   f. Calculate the approximation to the probability of belonging to segment m for each individual
   g. If segment weights are not used, the "simpler" segmentation is now constructed by assigning each individual to the segment that gives the highest value of the approximation to the probability. The β's generated as part of the output are the coefficients in the linear regression
   h. If segment weights are used, an index is defined by multiplying the approximation to the probability of belonging to segment m by the weight associated with that segment. The simpler segmentation is now constructed by assigning each individual to the segment that gives the highest index value. The β's generated as part of the output are the coefficients in the linear regression 2. Generate the question set for use in Part 1 (this is possible using the steps outlined above)
   a. Use steps 1.a to 1.h to construct a simpler segmentation based on only one question. This is done by searching through all available variables in the data set and finding the one that maximizes accuracy (i.e. the fraction of individuals whose "predicted" segment assignments correspond to their actual segment assignments)
   b. Once the simpler segmentation based on question M is constructed, the $(M+1)^{th}$ question is added by keeping question M and searching the remaining questions for the question that together with question M maximizes overall score. This results in (M+1) questions
   c. Then execute a linear optimization to replace each of the (M+1) questions with each of the questions in set K that was not included. This process should be continued until it is no longer possible to improve coverage by replacing any one of the questions and leaving the remaining unchanged; this process gives the questions to be used when segmentation is done based on (M+1) questions.

This entire process is executable using a mathematical programming language such as Fortran, Gauss, or statistical packages in tandem with C++ or other languages in which a linear optimization can be programmed.

VI. Behavioral Segment Scoring

A. Description
      1. Background: Database and data capture technologies have advanced to such a point that many industries track customer-level behaviors (e.g. financial services, retail sales, travel). A number of data mining techniques have been developed whose intent is to deduce customer habits by analyzing their behaviors (e.g. collaborative filtering).
      2. Business Complication: Unfortunately, behaviors are not necessarily indicative of customer beliefs. Consequently, those analytic systems have at best achieved modest success in designing tailored marketing strategies and tactics.
      3. Solution: Because the inventors' approach to segmentation is comprised on a comprehensive set of needs, attitudinal and behavioral variables to generate discrete, high-resolution segments, whose beliefs drive discrete behavioral patterns, detailed behavioral variables can be combined using a proprietary modeling technique to generate an accurate and scalable typing tool. The inventors have developed a method for efficiently leveraging behavioral databases to understand customer behavior. This application of Segment-on-the-Fly[SM] is most successful in industries that track rich behavioral data at the customer level (e.g. credit card, retail sales, grocery stores, travel companies).
   B. Impact/output
      1. The ability to use customer-level behaviors to rapidly type individuals into belief-based segments is highly scalable because no dialogue with the customer is required (to generate responses to the Segment-on-the-Fly[SM] questions.
      2. As with the Segment-on-the-Fly[SM] typing tool described in chapter V of this document, a scoring algorithm that can be calibrated by weighting segments to optimize either marketing coverage or accuracy.
   C. Methodology/components
      1. Data Conversion
         a. Determine optimal distribution of behaviors and sort into a finite number of groups
         b. Generally, a normal distribution, with each group having a statistically significant number of individuals, yields the best results. This analysis can be executed in any database or spreadsheet.
         c. Behaviors, especially dollar values and other such continuous values, must be grouped into categorical values in order to create sufficient commonalties within the data set to enable clustering.
      2. Variable Reduction
      Ideally, all of the variables would be used in the Segment-on-the-Fly[SM] process. In the event the number of variables is unwieldy (i.e. >100), it is acceptable to use CHAID/CART or factor analysis to reduce the variable set to <=100. The reason for doing this is that the linear optimization phase of developing the typing tool becomes impractical with an extremely large data set because the number of iterations required to cycle through the question combinations increases exponentially. Segment assignments are to be used as the objective function.

As with Segment-on-the-Fly$^{SM}$ proper, this process can be executed within a mathematical programming language such as Fortran or statistical packages in tandem with C++ or other languages in which linear optimization can be programmed.

3. Execute Segment-on-the-Fly$^{SM}$

Once the variable set has been reduced to a realistic size, execute the same exact steps as described in Section V.

As with Segment-on-the-Fly$^{SM}$ proper, this process can be executed within a mathematical programming language such as Fortran or a statistical package in tandem with C++ or other language in which linear optimization can be programmed.

VI. Panel Analysis

A. Description

1. Background: A number of market research companies maintain panels of customers that are dedicated to studying customer behaviors within a specific channel (e.g. Internet), category/industry (e.g. consumer packaged goods), or behavioral pattern (e.g. media consumption). Most companies use these panels to obtain a better understanding of their competitive markets. Current best practices in using these panels involve using analyses of demographics and consumption levels to divine the drivers of consumer demand. This approach, in essence, tries to understand demand-drivers through the lens of supply-side analytics.

2. Business Complication: As a result, the only credible application of a supply-side panel analysis is to understand macroeconomic trends in a given category/industry. However, attempts at using panels to conduct demand-side (i.e. consumer beliefs) analysis have gone awry because behaviors frequently do not reflect consumer beliefs.

3. Solution: The inventors have developed a procedure for conducting rigorous, demand-characterizing segmentation through the proprietary process described earlier in this document. The inventors' proprietary approach is not restricted to a specific channel, industry, or behavioral type. The inventors use a series of panels that track actual category usage and brand choice behaviors at either the household or individual level in the following 2 ways:
   a. As the source of objectively captured behavioral variables as the inputs to the critical behavioral variables used in the inventors' segmentation process
   b. A method for tracking changes in segment market share, category usage, and penetration as well as their causal marketing drivers (e.g. promotions, advertising, new product launch, etc . . . )

B. Impact/output

Regardless of panel-type, the impact of this process is highly material, to both developing high-resolution segmentation structures and monitoring/refining segment-based strategies and tactics:

1. Objective inputs to behavioral variables (measured in continuous values such as dollars or actual volumetric consumption):
   a. Overall category usage (i.e. gross-up of all category-relevant items)
   b. Category and/or brand penetration (e.g. how many individuals within the population use/purchase the category and/or brand in question)
   c. Brand share (e.g. a particular brand's share of category purchase/usage)
   d. Category and/or brand volume (e.g. a quantifiable amount of a category and/or brand that individuals in a given population use/purchase)
   e. Ingredient composition (e.g. acetaminophen, multi-grain, cholesterol free)
   f. Form (e.g. liquid, solid, crunchy)
   g. Company-level (i.e. gross-up of a company's portfolio of brands in the category)
   h. Individual brands (e.g. Tylenol, Nestle Crunch, Diet Pepsi)

2. Segment-based Tracking Applications
   a. Segment-level consumption/share
   b. Beliefs that drive purchase decisions
   c. Correlations among segments and brand choice
   d. Alignment (or lack thereof) of segment-beliefs with brand equities
   e. Segment-level economics
   f. Segment-based media planning
   g. Measuring advertising effectiveness
      i. Message performance: determine if advertising message (i.e. copy) had an influence, positive or negative, on brand awareness, penetration, share, and volume.
      ii. Media performance: determine if advertising media (i.e. vehicle such as print or television) had an influence, positive or negative, on brand awareness, penetration, share, and volume.

C. Methodology/components

Many of the details below are identical to those outlined in previous sections of this document:

1. Refine survey by using Babbitt score (Section 1).
2. Develop demand-side understanding of a given market by using Bestfit clustering to segment the data that was collected using the survey refined in Step 1.
3. Use composition analysis to group segment-members into Exemplars$^{SM}$, In-Betweeners$^{SM}$, or Outliers$^{SM}$ and evaluate composition scores.
4. Use Segment-on-the Fly$^{SM}$ to develop a typing tool for use in the survey panel
5. Score a representative sample of the survey panel using a typing tool. The channel for fielding this survey can be selected in accordance with specific objectives and/or constraints.
6. Conduct segment-level analysis to complete one or more of the applications listed in technique 7, section VII.C.
7. Conduct sub-segment analysis among identified Exemplars$^{SM}$, In-Betweeners$^{SM}$, and Outliers$^{SM}$ in order to refine analyses executed in the previous process step.

VIII. The Overall Segment-based Marketing Process

A. Description

1. Background: The combination of Wall Street pressure to accelerate earnings growth and an ever-increasing fragmentation of consumer preferences and media habits has created the financial imperative for every marketing-driven business to focus its strategy and tactics against the highest potential customer/prospect targets. Segmentation is the conventional marketing tool to select and profile the target.

2. Business Complication: Unfortunately, traditional approaches to segmentation have the following 3 fundamental flaws:
   a. The segments are not truly distinct from one another against a common set of variables. This lack of distinctiveness obscures the resolution of each segment and the overall structure
   b. The needs and attitudes of a given segment do not logically align with purchase usage and behaviors
   c. Each segment cannot be isolated and targeted from within the general population
3. Solution: The inventors' Segment-Based Marketing System$^{SM}$ is a business methodology that has solved each of these 3 flaws through a unique and distinctive set of business processes and econometric modeling techniques. The inventors' process provides businesses with the ability to create breakthrough marketing initiatives that have been proven to achieve profitable revenue growth that exceeds traditional approaches to marketing.

B. Impact/output
1. Marketing Strategy and Tactics
By using the inventors' Segment-Based Marketing System$^{SM}$, companies, regardless of industry and line of business, can redesign their marketing strategies and tactics in the following areas:
   a. Advertising, which includes:
      Copy strategy
      Development of creative
      Quantitative copy effectiveness testing
   b. Positioning, which includes:
      Brand equity
      Attribute association
      Benefit statements
   c. Media, which includes:
      Planning/purchasing
      Media vehicle selection
      Media vehicle evaluation
      CPM* optimization
   d. New product development
      Need gap analysis
      Price-attribute-bundle optimization
      Positioning (see above)
   e. Promotion, which includes:
      Customer relationship management (CRM)
      Sales force optimization
      New Product launch
   f. Tracking/refinement, which includes:
      Campaign management and evaluation
      Database design and management
      Monitoring share and usage by target
      Segment-level economics
CPM—Cost per Thousand (impressions)
2. Business Valuation/Performance Management
In addition, because a company's portfolio of customers has a direct and material impact on its profitability and growth potential, the inventors' Segment-Based Marketing System$^{SM}$ is particularly germane to the following activities:
   a. Private equity/venture capital
      Understanding a potential investment target's customer mix would enable PE/VC firms to develop a quantitative understanding of their investments' present and future cash flows.
   b. Leveraged buy-out
      LBO shops could determine how attractive a potential takeover target is and identify the strategies and tactics needed to "repair" it.
   c. Investment banking
      Corporate finance: Leverage understanding of a client's customer base (and therefore drivers of cash flow) to improve decision rules for valuation and capital-raising.
      Mergers and acquisitions: Determine synergy of customer portfolios of the merging companies and/or calculate the true value of an acquisition target's brand equity (i.e. goodwill) and customer base.
      Equity research: Enhance the understanding of specific company and industry profit/loss drivers.
C. Methodology/components
1. Developing Deep Customer/prospect Insights
   A marketing-driven company can implement the overall business methodology by uniquely combining the inventions disclosed herein with standard marketing techniques.
2. Marketing Strategies and Tactics
   The deep customer/prospect insights gleaned through high resolution segmentation cam be translated into actionable marketing programs. The inventors' proprietary methods for typing customers/prospects are the means by which these insights are executed in different business applications. The following chart provides several examples of Segment-Based Marketing applications. It is not intended to be a complete and exhaustive list of applications.
D. Data Types
   Some of the disclosed processes use scalar, categorical, and/or continuous variables from surveys fielded to a study population and/or behavioral/purchase data obtained from either the business itself or a panel, such as IRI, AC Nielsen, comScore, Simmons, MRI, or Nielsen ratings panel (not affiliated with AC Nielsen).

| Data Input | Data Type | Accessibility |
| --- | --- | --- |
| Needs Variables | Scalar or Categorical | Common; used by most industry firms |
| Attitude Variables | Scalar or Categorical | Common; used by most industry firms |
| Behavior Variables | Scalar or Categorical or Continuous transformed into Categorical/Scalar | Common; used by most industry firms |
| Panel-Derived Variables | Categorical or Continuous transformed into Categorical/Scalar | Uncommon; requires subscription or alliance with a panel company with IRI or Nielsen. The inventors have relationships with IRI and comSCORE |
| Business-Derived Variables | Categorical or Continuous transformed into Categorical/Scalar | Common; used by most industry firms |
| Composite Variables | Categorical or Continuous transformed into Categorical/Scalar | Rare; created by the inventors using database-derived and/or panel-derived variables |

DESCRIPTION OF THE FIGURES

FIG. 1 is a flowchart of an exemplary embodiment of a Method 1 of the present invention. All and/or part of Method 1 can also be known as the Babbitt Score technique.

At activity 1100, for all observations (respondents), provided values (e.g., responses) associated with a variable (e.g., survey question), can be converted into proxy values, if necessary to insure that each variable has only a finite set of values to be analyzed. For example, if the provided values are continuous, those provided values can be converted into one of several scalar/categorical or discrete proxy values. By way of further example, if a variable was "On a scale of 1 to 10 (with 10 being best), how do you rate the service you received?", and a provided value was 8.2, that provided value could be converted to a proxy value of 8. Furthermore, proxy values can be a subset of provided values. For example, if a provided value was categorical (e.g., "red", "green", or "blue"), then the proxy values can also be categorical, and can be identical to the provided values. Moreover, the conversion of provided values to proxy values explained in relation to activity 1100 applies to the provided values of Methods 2 through 8 and 10 as well (described below).

At activity 1200, proxy values associated with a variable (e.g., survey question) can be segregated into categories, (e.g., Top 2 box, Top 3 box , etc.). At activity 1300, for each category, a response distribution can be determined by dividing a number of responses in the category by the total number of corresponding responses for all categories. At activity 1400, a top box score can be calculated by adding the top box response (%) to the bottom box response (%) and subtracting an ideal distribution of neutrals (%) to obtain a result. Then, an absolute value of the result can be multiplied by 100.

At activity 1500, a difference score can be calculated by subtracting the bottom box response (%) from the top box response (%) and multiplying an absolute value of the result by 100. At activity 1600, an effectiveness score, also known as the Babbitt score, for the survey questions can be calculated by adding the top box score to the difference score. At activity 1700, the survey question can be evaluated based on the effectiveness score.

Figure 2A:
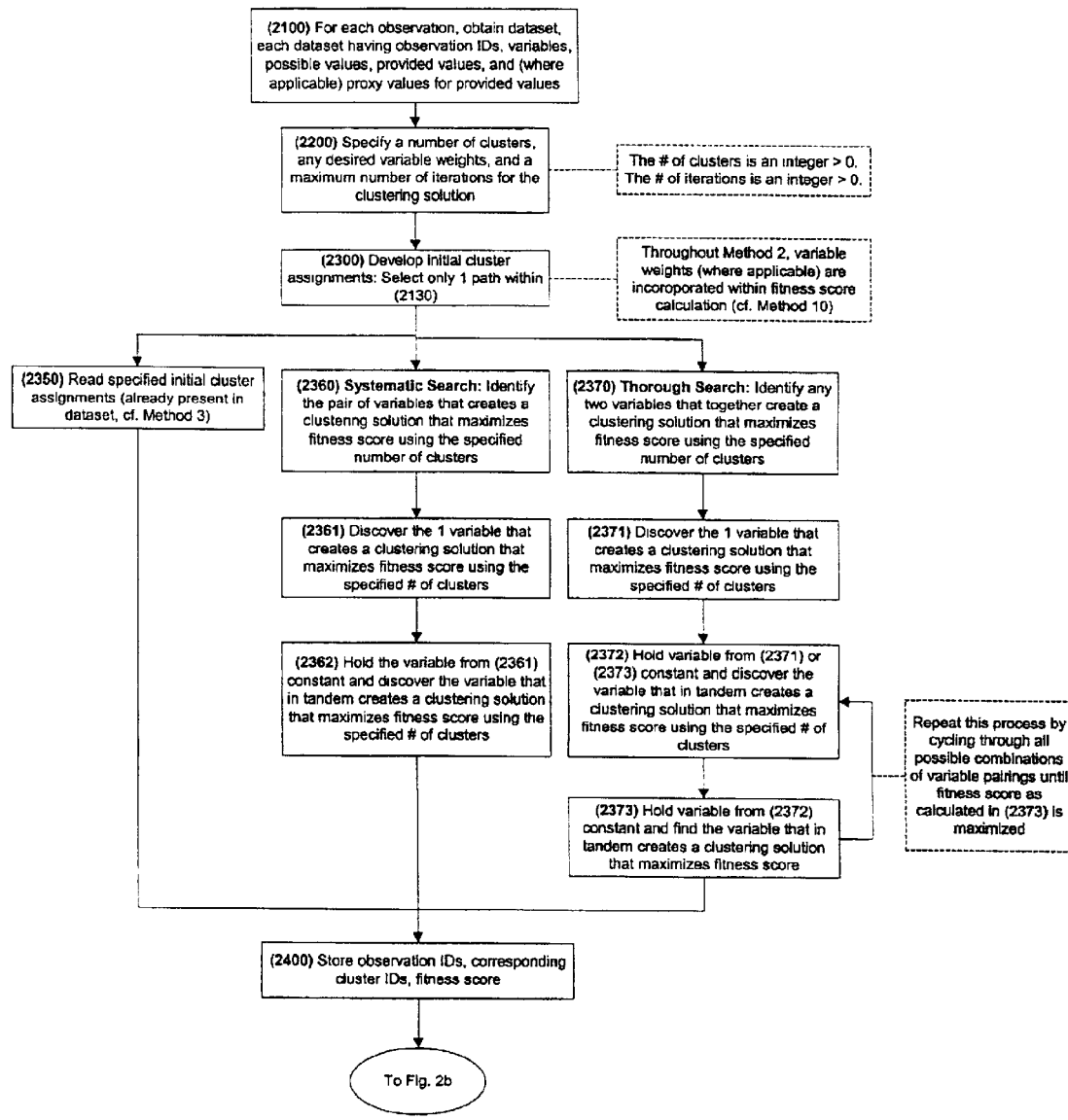
Figure 2C:
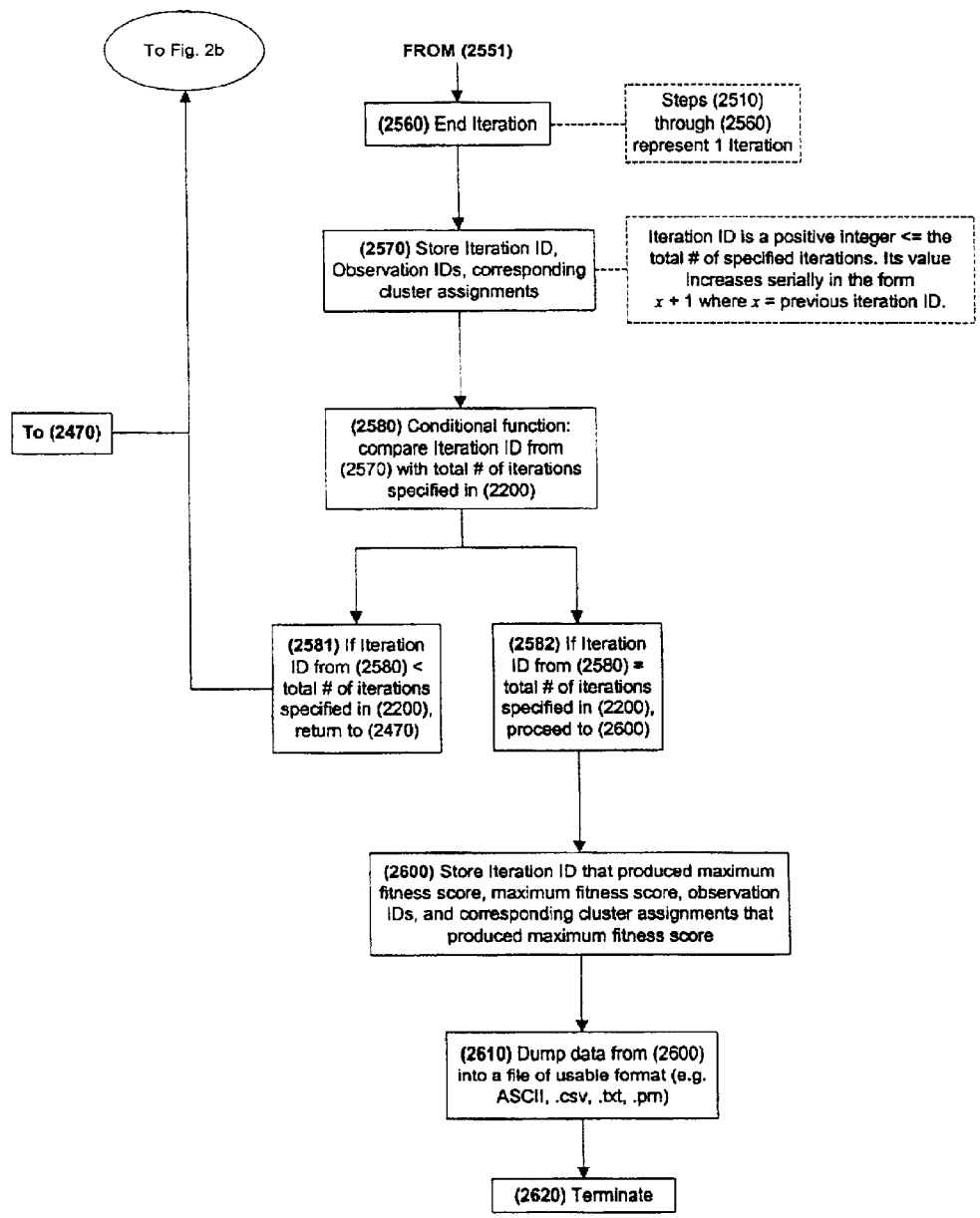

FIGS. 2a, 2b and 2c are a flowchart an embodiment of a method 2 of the present invention. All and/or part of Method 2 can also be known as the Bestfit Clustering technique. Referring to FIG. 2a, at activity 2100, for each observation, a dataset can be obtained, each dataset having observation identifications, variables, possible values, and provided values (where applicable provided values include any developed proxy values). At activity 2200, a number of clusters can be specified, any number of desired variables' weights for any number of desired variables within a data set, and a maximum number of iterations of the clustering solution can be specified. The number of clusters can be an integer greater than zero, and the number of iterations can be an integer greater than zero. At activity 2300, initial cluster assignments can be developed. These initial cluster assignments can be developed using any of three techniques.

The first technique can be shown at activity 2350, where a specified initial cluster assignment can be obtained from a previous dataset.

The second technique can be shown at activities 2360 through 2362, where a systematic search can be made for the initial cluster assignment. In this systematic search, a pair of variables can be identified that creates a clustering solution that maximizes fitness score using the specified number of clusters. At activity 2361, the one variable that creates a clustering solution that maximizes score using the specified number of cluster can be discovered. At activity 2362, the discovered variable from activity 2361 can be held constant and a second variable that creates a clustering solution that maximizes fitness score using the specified number of clusters can be discovered.

The third technique can be shown at activities 2370 through 2373, where a thorough search can be made. During the thorough search, any two variables that together create a clustering solution that maximizes fitness score using the specified number of clusters can be identified. At activity 2371, the one variable that creates a clustering solution that maximizes fitness score using specified number of clusters can be discovered. At activity 2372, holding the discovered variable from activity 2371 constant, a second variable that in tandem with the variable being held constants creates a clustering solution that maximizes fitness score using a specified number of clusters can be discovered. At activity 2373, the second discovered variable can be held constant and a third variable can be found that in tandem with the second variable being held constant creates a clustering solution that maximizes fitness score. Activities 2372 and 2373 can be repeated interactively and iteratively by cycling through all possible combinations of variable pairings until the fitness score that can be calculated in activity 2373 can be maximized.

After one of the three techniques are followed for developing an initial cluster assignment, at activity 2400, the observation identifications, the cluster identifications, and the fitness scores can be stored.

Referring to FIG. 2b, at activity 2450, for each cluster and variable, the mode of the provided values can be calculated. At activity 2460, the cluster identification, variable identification, and corresponding mode of activity 2450 can be stored. At activity 2470, a fraction of observations can be selected and divided evenly among all specified clusters for the dataset. Preferably, the observations are chosen randomly and the exact fraction does not exceed 10% of the entire dataset's population of observations. At activity 2480, the observations from activity 2470 can be randomly reassigned to different clusters. At activity 2490, for each cluster and variable the mode of the provided values can be calculated. At activity 2500, a fitness score to the clustering solution developed in activity 2480 can be calculated. At activity 2505, the fitness score, cluster assignments and observation identifications can be stored.

At activity 2510, one random observation from a random cluster can be selected and its cluster assignment can be changed. At activity 2520, the fitness scores of activity 2510 can be calculated. At activity 2530, the fitness score of activity 2520 can be compared with the fitness score of activity 2505. At activity 2531, if the fitness score of activity 2520 can be less than or equal to the fitness score of activity 2505, all possible cluster assignments for the observation selected in activity 2510 can be cycled through until the fitness can be maximized.

At activity 2532, the maximum fitness score of activity 2531 can be compared with that of 2505. At activity 2533, if the maximum fitness score of activity 2531 can be less than or equal to the fitness score of activity 2505, then the selected observation can be returned to the original cluster assignment. At activity 2534, method 2 returns to activity 2510.

Considering again the comparison at activity 2532, if the maximum fitness score of activity 2531 can be greater than the fitness score of activity 2505, at activity 2535 method 2 proceeds to activity 2540. At activity 2540, the observation identification can be stored as well as the new cluster assignments. At activity 2550, the cluster assignments of activity 2505 are replaced with the cluster assignments of activity 2540 and method 2 returns to activity 2510.

Considering again the comparison at activity 2530, if the fitness score of activity 2520 can be greater than the fitness score of activity 2505, method 2 proceeds to activity 2540.

If method 2 can be looping from activity 2550, once the fitness score of activity 2520 can be compared with that of activity 2505 at activity 2530, method 2 then proceeds to activity 2551. At activity 2551, if the fitness score of activity 2520 can be equal to that of activity 2505, method 2 proceeds to activity 2560. At activity 2552, if the fitness score of activity 2520 can be less than or greater than that of activity 2505, method 2 returns to activity 2540.

Referring now to FIG. 2c, at activity 2560, the iteration ends, where activities 2510–2560 represent one iteration. At activity 2570, the iteration identification, the cluster identification, and the corresponding cluster assignments are stored. The iteration identification can be a positive integer that can be less than or equal to the total number of specified iterations. The value of the iteration identification can increase serially in the form of x+1 where x equals the previous iteration's identification.

At activity 2580, the iteration identification from activity 2570 can be compared with the total number of iterations specified in activity 2200. At activity 2581, if the iteration identification from activity 2580 can be less than the total number of iterations specified in activity 2200, method 2 can return to activity 2470. At activity 2582, if the iteration identification from activity 2580 can be equal to the total number of iterations specified in activity 2200, method 2 can proceed to activity 2600. At activity 2600, the iteration identification that produced the maximum fitness score, the maximum fitness score itself, the observation identifications, and the corresponding cluster assignments can be stored. At activity 2610, the data from activity 2600 can be placed in a file, such as an ASCII, .csv, .txt, or .prn file. At activity 2620, method 2 can be terminated.

Figure 3:
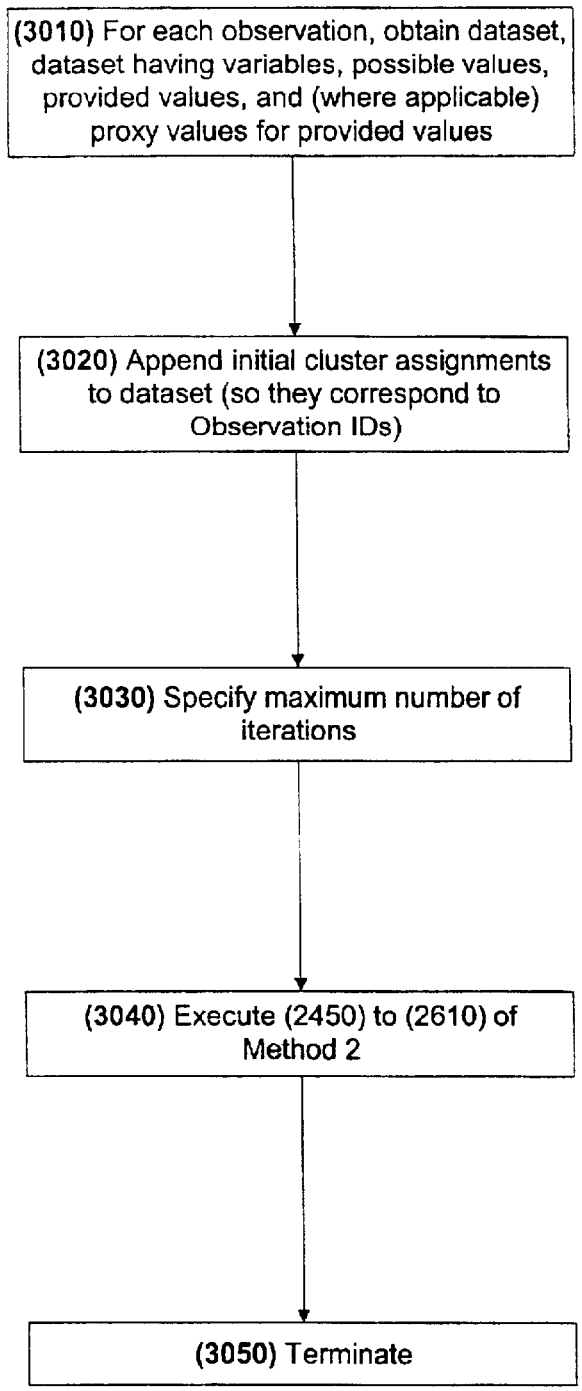
FIG. 3 is a flowchart of an exemplary embodiment of a method 3 of the present invention.

FIG. 3 shows an exemplary embodiment of a method 3 of the present invention. All and/or part of Method 3 can also be known as the champion/challenger clustering refinement technique. At activity 3010, for each observation, a dataset can be obtained, the dataset having variables, possible values, and provided values. At activity 3020, initial cluster assignments are appended to the dataset so that those initial cluster assignments corresponds to observation identifications. At activity 3030, a maximum number of iterations can be specified. At activity 3040, activities 2450–2610 of method 2 can be executed. At activity 3050, method 3 can be terminated.

Figure 4:
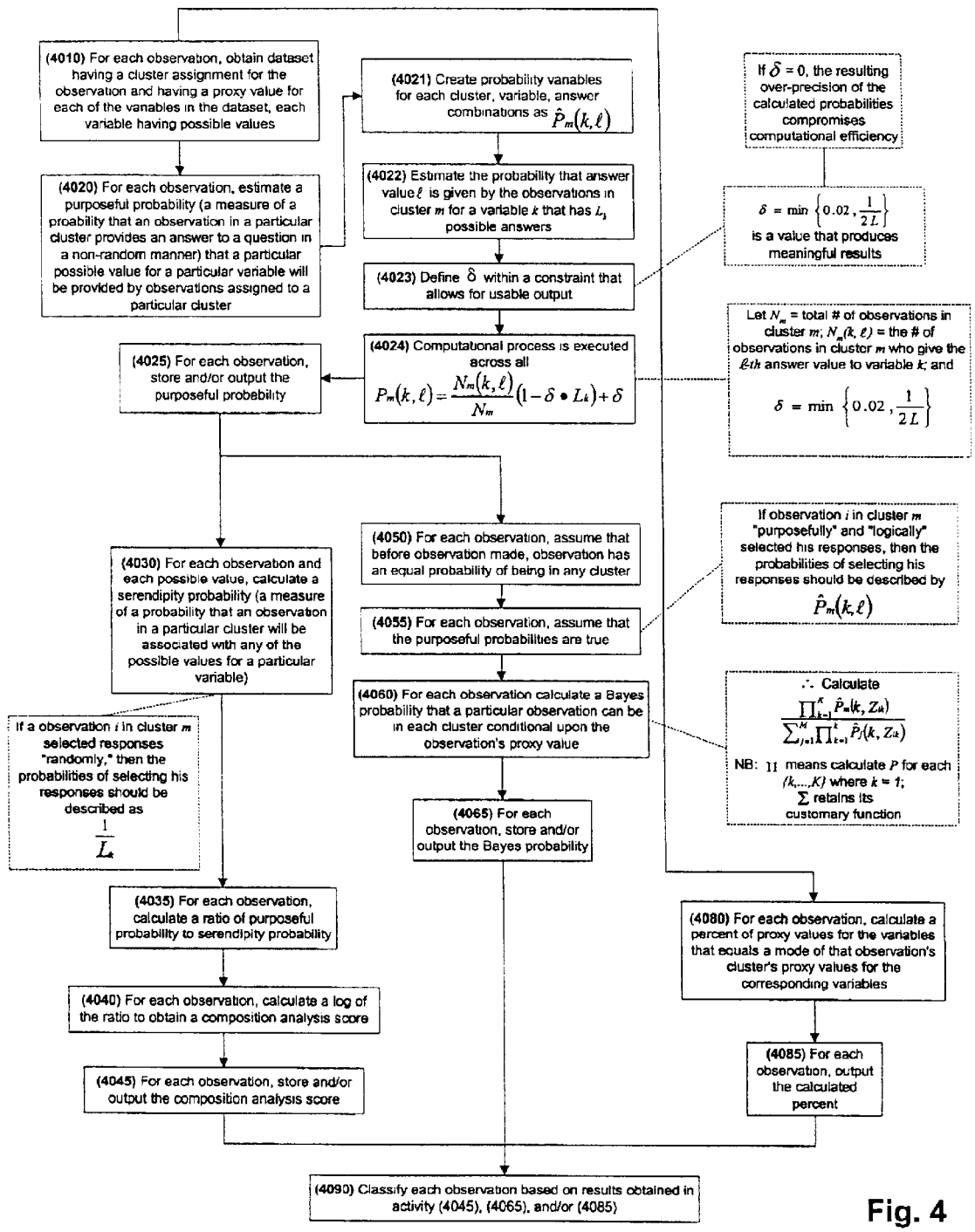
FIG. 4 is a flowchart of an exemplary embodiment of a method 4 of the present invention.

FIG. 4 is a flow chart of an exemplary embodiment of a Method 4 of the present invention. All and/or part of Method 4 can also be known as the composition analysis technique.

At activity 4010, for each observation, a dataset is obtained having a cluster assignment for the observation and having a proxy value for each of the variables in the dataset, each variable having possible values. At activity 4020, for each observation, an estimate is made that a purposeful probability (a measure of a probability that an observation in a particular cluster provides an answer to a question in a non-random manner) that a particular possible value for a particular variable will be provided by observations assigned to a particular cluster. At activity 4021, probability variables for each cluster, variable and answer combinations are created as $P_m(k, l)$. At activity 4022, the probability that answer value l is given by the observations in cluster m for variable k that has $L_k$ possible answers is estimated. At activity 4023, a value δ is defined within a constraint that allows for usable output. The value $$\delta = \min\left\{0.02, \frac{1}{2L}\right\}$$

is a value that produces meaningful results. If δ=0, the resulting over-precision of the calculated probabilities can compromise computational efficiency.

At activity 4024, a computational process is executed across all $$P_m(k, l) = \frac{N_m(k, l)}{N_m}(1 - \delta \cdot L_k) + \delta,$$

where $N_m$=the total number of observations in cluster m; $N_m(k, l)$=the number of observations in cluster m who give the l-th answer value to variable k; and $$\delta = \min\left\{0.02, \frac{1}{2L}\right\}.$$

At activity 4025, for each observation, the purposeful probability can be stored and/or outputted. At activity 4030, for each observation and each possible value, a serendipity probability (a measure of a probability that a observation in a particular cluster will be associated with any of the possible values for a particular variable) can be calculated. If an observation i in cluster m selected responses "randomly", then the probabilities of selecting his responses should be described as $$\frac{1}{L_k}.$$

At activity 4035, for each observation, a ratio of purposeful probability to serendipity probability can be calculated. At activity 4040, for each observation, a logarithm of the ratio from activity 4040 can be calculated to obtain a composition analysis score. At activity 4045, for each observation, the composition analysis score can be stored and/or outputted.

At activity 4050, for each observation, an assumption can be made that before an observation is made, the observation has an equal probability of being in any cluster. At activity 4055, for each observation, an assumption can be made that the purposeful probabilities are true. Thus, if observation i in cluster m purposefully and logically selected his responses, then the probabilities of selecting his responses should be described by $P_m(k, l)$. At activity 4060, for each observation, a Bayes probability can be calculated that a particular observation can be in each cluster is conditional upon the observation s proxy value. At activity 4065, for each observation, the Bayes probability can be stored and/or outputted.

At activity 4080, for each observation, a percent of proxy values for the variables that equals a modes of that observation s cluster s proxy values for the corresponding variables can be calculated. At activity 4085, for each observation, the calculated percent can be stored or outputted.

At activity 4090, each observation can be classified based on the results obtained in activity 4045, 4065 and/or 4085.

Figure 5A:
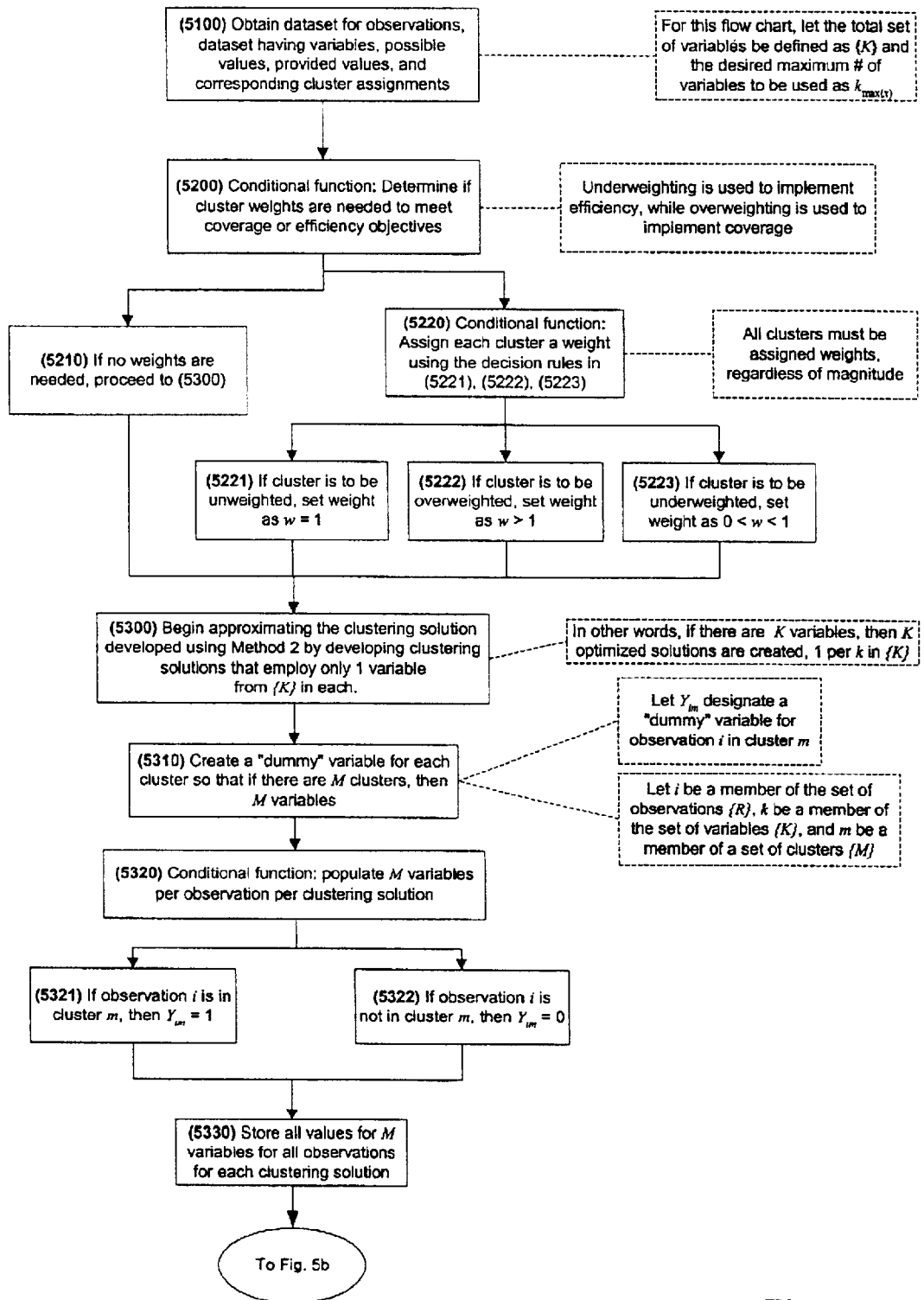
FIGS. 5a, 5b, and 5c are a flowchart of an exemplary embodiment of a method 5 of the present invention.

FIG. 5a shows an exemplary embodiment of a method 5 of the present invention. All and/or part of Method 5 can also be known as the Segmentation-On-The-Fly technique.

At activity 5100, a dataset for observations can be obtained, the dataset having variables, possible values, provided values, and corresponding cluster assignments. For the purposes of FIG. 5a the total set of variables can be defined as {K} and the maximum number of variables to be used can be defined as $k_{max(x)}$. At activity 5200, a determination can be made regarding whether cluster weights are needed to meet coverage or efficiency objectives. Underweighting can be used to implement an efficiency objective, while overweighting can be used to implement a coverage objective.

At activity 5210, if no weights are needed, method 5 can proceed to activity 5300. At activity 5220, if weighting can be needed, each cluster can be assigned a weight using the decision rules of one of activities 5221, 5222, or 5223. In the weighted situation, it can be preferable to assign weights to all clusters regardless of the magnitude of the clusters. In activity 5221, if the cluster can be unweighted, the weight can be set as w=1. At activity 5222, if the cluster can be to be overweighted, the weight can be set as w>1. At activity 5223, if the cluster can be to be underweighted, the weight can be set as 0<w<1.

At activity 5300, the clustering solution developed using Method 2 can begin to be approximated by developing a clustering solution that employs only 1 variable from {K} in each. In other words if there are K variables, then K optimized solutions can be created 1 per k in {K}. An optimized solution is a clustering solution that has achieved a maximum score (however defined) within its defined constraints (e.g. number of variables, number of respondents, number of iterations, number of clusters, etc.) At activity 5310, a dummy variable can be created for each cluster so that if there were M clusters, then there are M variables. For example, let $Y_{im}$ designate a dummy variable for observation i in cluster m. Let i be a member of the set of observations {R}, k be a member of the set of variables {K}, and m be a member of the set of clusters {M}. At activity 5320, m variables can be populated per observation per clustering solution. At activity 5321, if observation i can be in cluster m then $Y_{im}$ can be set to 1. At activity 5322, if observation i can be not in cluster m then $Y_{im}$ can be set to 0. At activity 5330, all values for M variables can be stored for all observation for each clustering solutions.

Figure 5B:
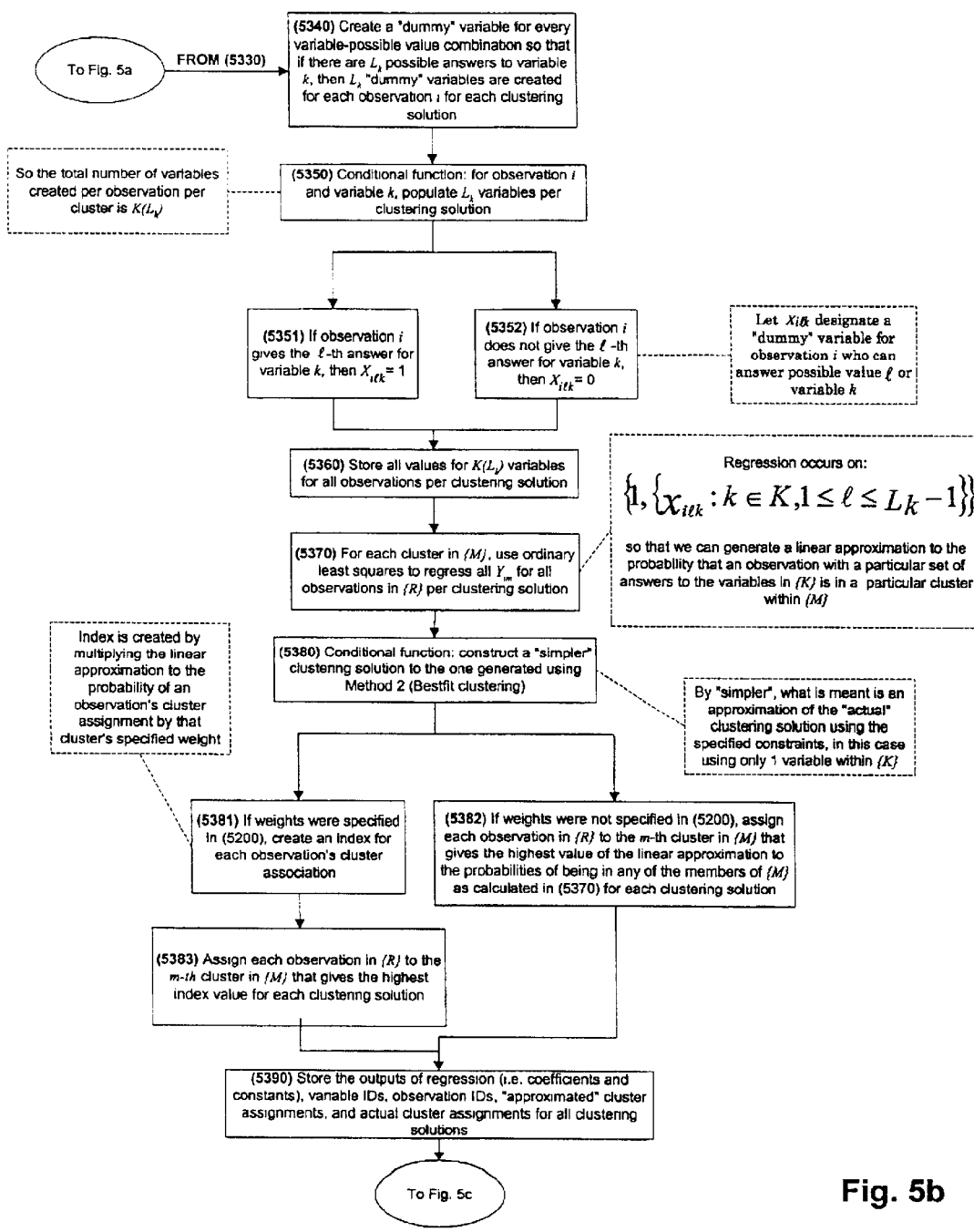

Referring to FIG. 5b, at activity 5340 a dummy variable can be created for every variable-possible value combination so that if there are $L_k$ possible answers to variable k, then $L_k$ "dummy" variables are created for each observation i for each clustering solution. Thus, $\chi_{ilk}$ can designate a dummy variable for observation i who can answer possible value n for variable k.

At activity 5350, for each observation i and variable k, $L_k$ variables can be populated per clustering solution. Thus the total number of variables created per observation per cluster is $K(L_k)$. At activity 5351, if observation i gives the l-th answer for variable k, then $\chi_{ilk}$ can be set to 1. At activity 5352, if observation i does not give the l-th answer for variable k, then $\chi_{ilk}$ can be set to 0.

At activity 5360, all values for $K(L_k)$ variables for all observations per clustering solutions can be stored. At activity 5370, for each cluster in {M}, ordinary least squares can be used to regress all $Y_{im}$ for all observations in {R} per clustering solution. Thus regression occurs on $\{1, \{\chi_{ilk}: k \epsilon K, 1 \leq l \leq L_k-1\}\}$ so that a linear approximation can be generated to the probability that an observation with a particular set of answers to the variables in {K} can be in a particular cluster within {M}.

At activity 5380, a simpler clustering solution can be constructed to the one generated using Method 2. By "simpler" what is meant is an approximation of the actual clustering solution using the specified constraints in this case using only one variable k within {K}. At activity 5381, if weights were specified in activity 5200, an index for each observation's cluster association can be created. An index can be created by multiplying the linear approximation to the probability of an observation's cluster assignment by that cluster's specified weight. An index is created for each possible cluster assignment. At activity 5383, each observation {R} can be assigned to the m-th cluster in {M} that gives the maximized index value of the clusters in the clustering solution.

At activity 5382, if weights were not assigned in activity 5200, each observation in {R} can be assigned the m-th cluster in {M} that gives the maximum value of the linear approximation to the probabilities of being in any of the cluster members of {M} as calculated in activity 5370 for each clustering solution. At activity 5390, the outputs of regression, (i.e., the coefficients and constants) can be stored as well as the variable identifications, observation identifications, the approximated cluster assignments, and the actual cluster assignments for all clustering solutions.

Figure 5C:
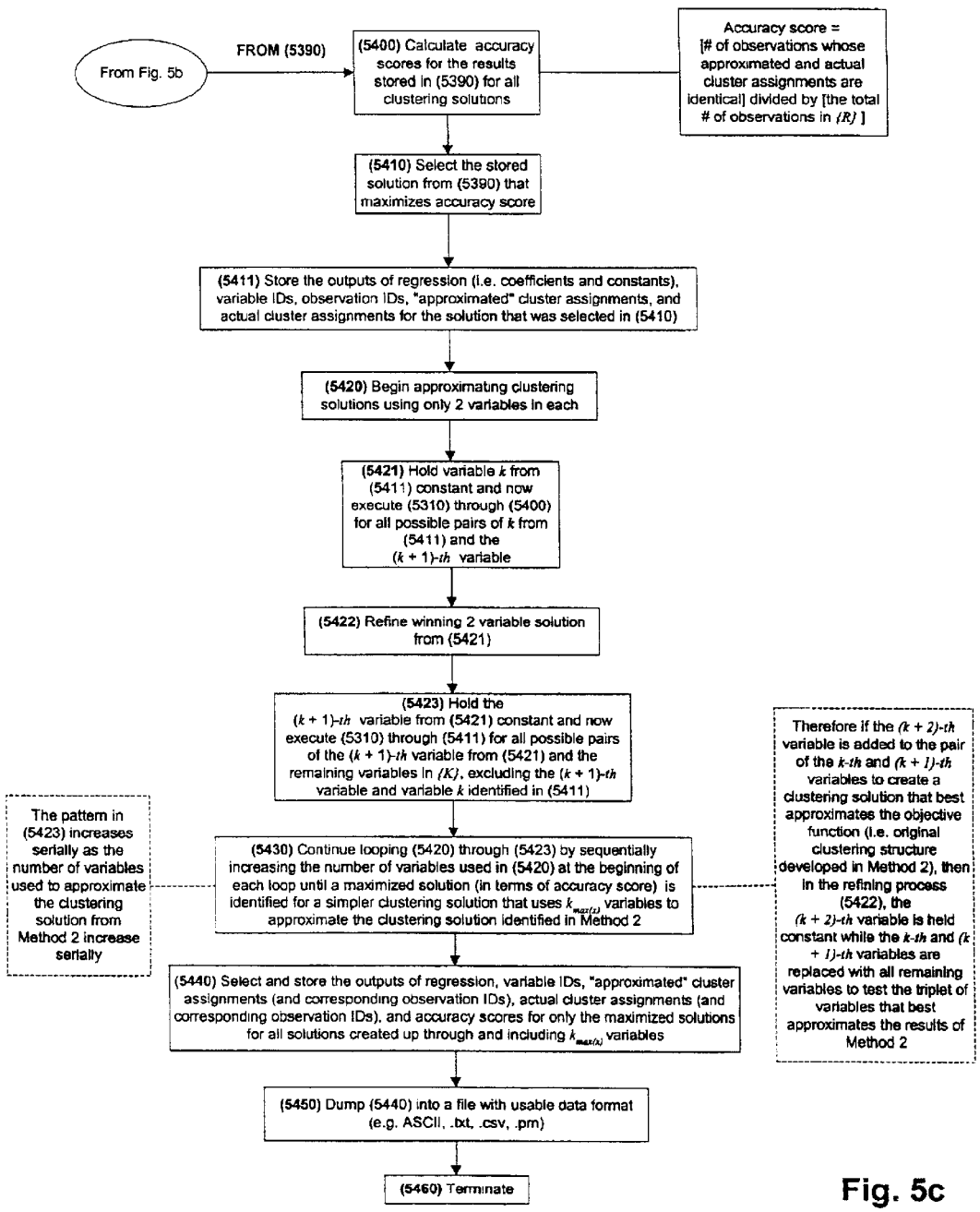

Turning now to FIG. 5c, at activity 5400, an accuracy score for the results obtained in activity 5390 for all clustering solutions can be calculated. An accuracy score can equal the number of observations, whose approximated and actual cluster assignments are identical, divided by the total # of observations in {R}. At activity 5410, the stored solution from activity 5390 that maximizes the accuracy score can be selected. At activity 5411, the outputs of regression (i.e., the coefficients and constants) can be stored along with the variable identifications, observations identifications, the approximated cluster assignments, and the actual cluster assignments for the solution that was selected in activity 5410.

At activity 5420, clustering solutions can be approximated using only 2 variables in each. At activity 5421, variable k from activity 5411 can be held constant and activities 5310 through 5400 can be executed for all possible pairs comprising k from activity 5411 and the (k+1)-th variable.

At activity 5422, the winning 2 variable solution from activity 5421 can be refined. At activity 5423, the (k+1)-th variable from activity 5421 can be held constant and activities 5310 through 5411 can be executed for all possible pairs comprising the (k+1)-th variable from activity 5421 and the remaining variables in {K}, excluding the (k+1)-th variable and the variable k identified in activity 5411. The pattern in activity 5423 can increase serially as the number of variables used to approximate the clustering solution from Method 2 increases serially.

At activity 5430, a continual loop through activities 5420 through 5423 can be performed, sequentially increasing the number of variables used in activity 5420 at the beginning of each loop until a maximum solution (in terms of accuracy) is identified for a simpler clustering solutions that uses $k_{max(x)}$ variables to approximate the clustering solution identified in Method 2. Therefore if the (k+2)-th variable is added to the pair of the k-th and (k+1)-th variables to create a clustering solution that best approximates the objective function (i.e., the original clustering structure developed in Method 2), then in the refining activity 5422, the (k+2)-th variable is held constant while the k-th and the (k+1)-th variables are replaced with all remaining variables to test the triplet of variables that best approximates the results of Method 2.

At activity 5440, the outputs of regression, the variable identifications, the approximate cluster assignments (and the corresponding observation identifications), the actual cluster assignments (and the corresponding observation identifications), and accuracy scores for only the maximized solutions for all solutions created up through and including $k_{max(x)}$ variables can be selected and stored. At activity 5450 the stored information from activity 5440 can be placed into a file of any appropriate format, e.g. ASCII, .txt, .csv, and/or .prn. At activity 5460 Method 5 can be terminated.

Figure 6A:
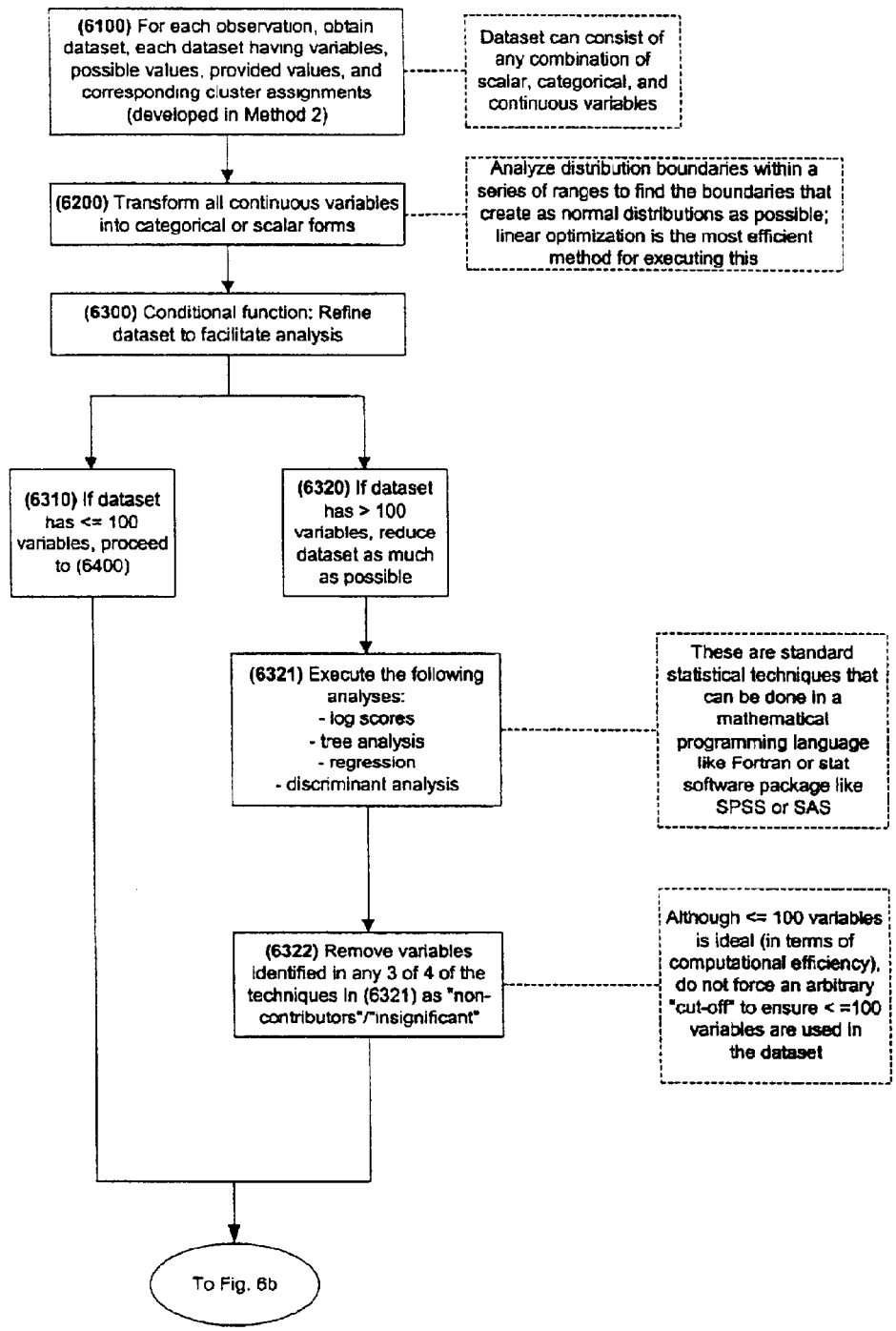
FIGS. 6a and 6b are a flowchart of an exemplary embodiment of a method 6 of the present invention.

FIG. 6a shows an exemplary embodiment of a Method 6 of present invention. All and/or part of Method 6 can also be known as the behavioral segment scoring technique.

At activity 6100, for each observation, a dataset is obtained, each dataset having variables, possible values, provided values, and corresponding cluster assignments (which could have been developed using Method 2). The dataset can consist of any combination of scalar, categorical, and/or continuous variables. At activity 6200, all continuous variables can be transformed into categorical or scalar forms. This transformation can be done by analyzing distribution boundaries within a series of ranges to find the boundaries that create as normal distributions as possible. In many situations, linear optimization is the most efficient method for performing this boundary analysis.

At activity 6300, the dataset can be refined to facilitate further analysis. At activity 6310, if the dataset has 100 or fewer variables, Method 6 can proceed to activity 6400. At activity 6320, if the data set has greater than 100 variables, the dataset can be reduced as much as possible. To perform this reduction, at activity 6321, any of the following analytical techniques can be implemented: log scores, tree analysis, regression, and/or discriminant analysis. These analytical/statistical techniques can be performed in a mathematical programming language like Fortran or using a statistical software package such as SPSS or SAS. At activity 6322, variables identified in any 3 of the 4 techniques of activity 6321 as "non-contributing" and/or "insignificant" can be removed. Although in some situations a quantity of 100 or less variables can be ideal in terms of computational efficiency, an arbitrary cut-off generally should not be forced to ensure the number of variables used in the dataset is 100 or less.

Figure 6B:
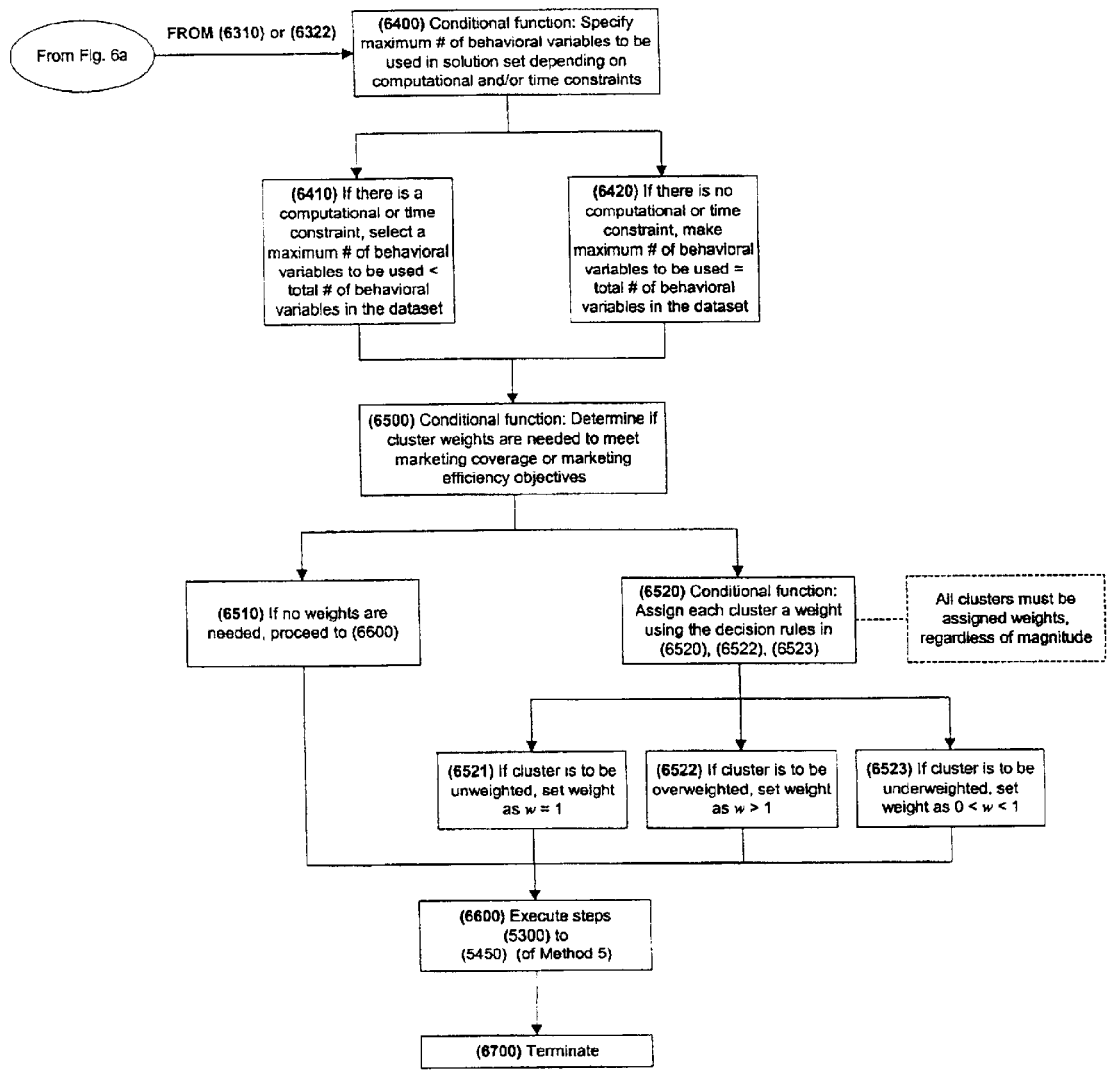

Referring to FIG. 6b, at activity 6400, the maximum number of behavioral variables to be used in the solutions set can be specified depending on computational and/or time constraints. At activity 6410, if there are computational and/or time constraints, a maximum number of behavioral variables to be used can be selected that is less than the total number of behavioral variables in the dataset. At activity 6420, if there are no computational and/or time constraints, the maximum number of behavioral variables to be used can set equal to the total number of behavioral variables in the dataset.

At activity 6500, a determination can be made regarding whether cluster weights are needed to meet marketing coverage or marketing efficiency objectives. At activity 6510, if no weights are needed, Method 6 can proceed to activity 6600. At activity 6520, if weights are needed, each cluster can be assigned a weight using the decision rule of one of activities 6520, 6522, and 6523. In any event, if weights are needed, each cluster must be assigned a weight regardless of the cluster's magnitude. At activity 6521, if the cluster is to be unweighted, the weight can be set as w=1. At activity 6522, if the cluster is to be overweighted, the weight can be set as w>1. At activity 6523, if the cluster is to be underweighted, the weight can be set as 0<w<1.

At activity 6600, activities 5300 through 5450 of Method 5 can be executed. At activity 6700, Method 6 can be terminated.

Figure 7:
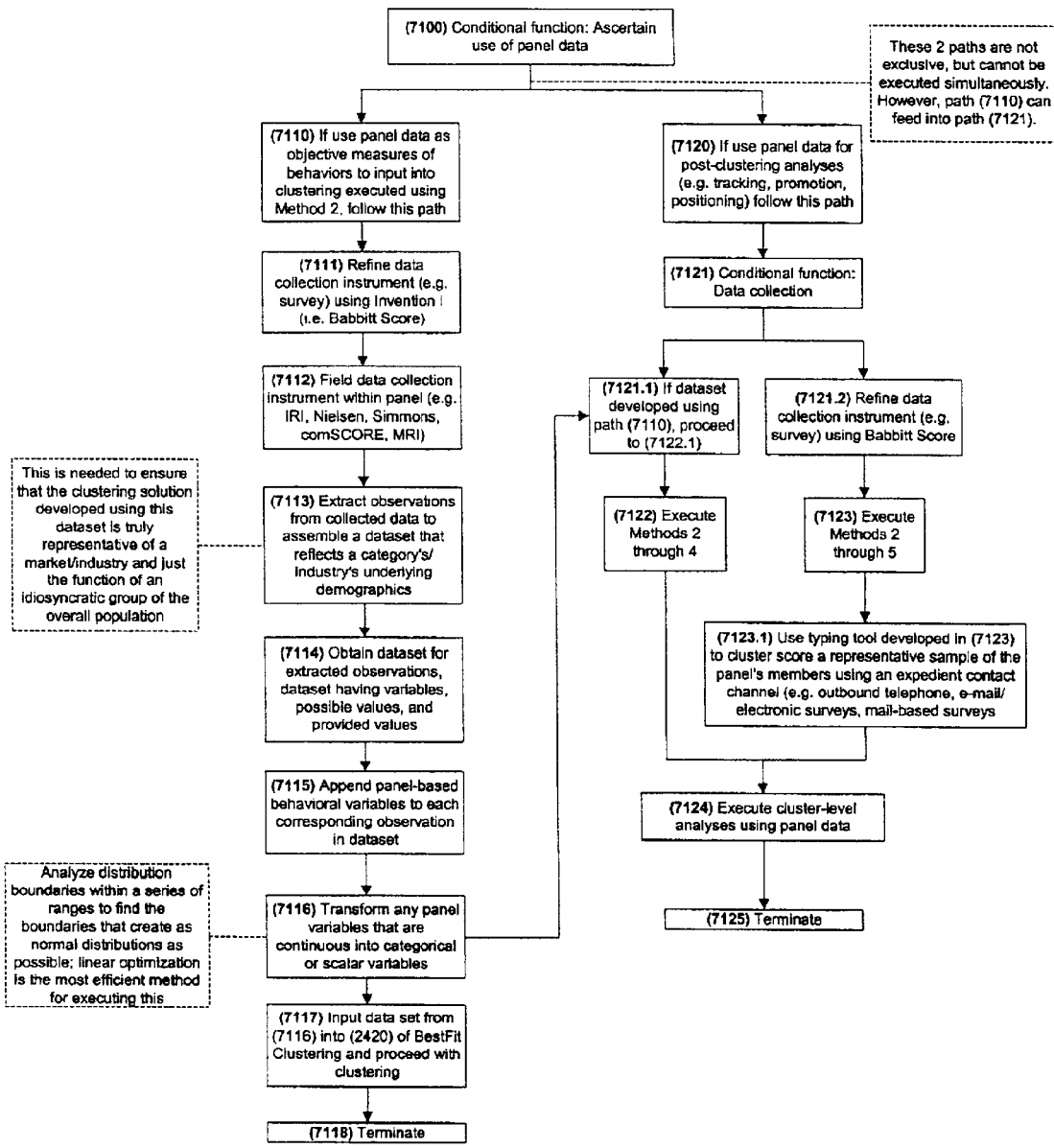
FIG. 7 is a flowchart of an exemplary embodiment of a method 7 of the present invention.

FIG. 7 shows an exemplary embodiment of a Method 7 of the present invention. All and/or part of Method 7 can also be known as the panel analysis technique.

At activity 7100, a use for panel data is ascertained. For example, panel data can be used as an objective measure of behavior that can be input into a clustering technique such as that of Method 2. As another example, panel data can be used for post-clustering analyses, e.g. tracking, promotion, media performance, or positioning.

At activity 7110, if the panel data is to be used as objective measure, then at activity 7111, the data collection instrument, e.g. survey, can be refined using Method 1 (i.e., the Babbitt Score technique). At activity 7112, the data collection instrument can be fielded within a panel (e.g. IRI, Nielsen, Simmons, comSCORE and/or MRI). At activity 7113, observations can be extracted from the collected data to assemble a dataset that reflects a category's and/or industry's underlying demographics. In some situations, this activity can be necessary to ensure that the clustering-solution developed using this dataset is truly representative of a market or industry and is not just the function of an idiosyncratic group of the overall population.

At activity 7114, the dataset can be obtained for the extracted observations, the dataset having variables, possible values, and provided values. At activity 7115, the panel-based behavioral variables can be appended to each corresponding observation in the dataset. At activity 7116, any panel variables that are continuous can be transformed into categorical or scalar variables. This transformation can be performed by analyzing distribution boundaries within a series of ranges to find the boundaries that create as normal distribution as possible. In many situations, linear optimization is the most efficient method for executing this analysis.

At activity 7117, the dataset from activity 7116 can be input into activity 2420 of Method 2 (the Bestfit Clustering technique) and clustering can proceed using Method 2. At activity 7118 the process can terminate.

Turning now to use of the panel data for post-lustering analysis, at activity 7121, data is collected. At activity 7121.1, if the dataset was developed using the panel data as an objective measure of behavior, Method 7 can continue to activity 7122, where Methods 2 through 4 can be executed.

Alternatively, if panel data was used for post-clustering analysis, Method 7 can continue to activity 7121.2, where the data collection instrument can be refined using Method 1 (the Babbitt Score technique). At activity 7123, Methods 2 through 5 can be executed. At activity 7123.1, the typing tool developed in activity 7123 can be used to cluster score a representative sample of the panel's members using an expedient contact channel (e.g., outbound telephone, e-mail/ electronic surveys, and/or mail-based surveys, etc.). At activity 7124, a cluster level analysis can be executed using the panel data. At activity 7125, Method 7 can be terminated.

Figure 8:
FIG. 8 is a flowchart of an exemplary embodiment of a method 8 of the present invention.

FIG. 8 is a flowchart of an exemplary embodiment of a Method 8 of the present invention. All and/or part of Method 8 can also be known as the overall segment-based marketing methodology, and can include some or all of Methods 1 through 10.

At activity 8100, a pilot survey can be developed and fielded. At activity 8200, the survey can be refined. This refinement can implement Method 1 and/or Method 2.

At activity 8300, a full survey can be fielded. At activity 8400, the data from the survey can be cleaned, refined, and otherwise analyzed, using, for example, Method 4. At activity 8500, clusters can be created using, for example, Method 1, 3, and/or 7. At activity 8600, clusters can be refined using, for example, Method 4.

At activity 8700, Method 5 can be implemented. At activity 8750, Method 6 can be used. At activity 8800, panel variables can be appended to the results of activity 8750, and Method 7 can then be utilized in activity 8850. At activity 8900, insights into the segments can be gained, and at activity 8950, marketing ideas, strategies, and tactics can be developed and implemented.

Figure 9:
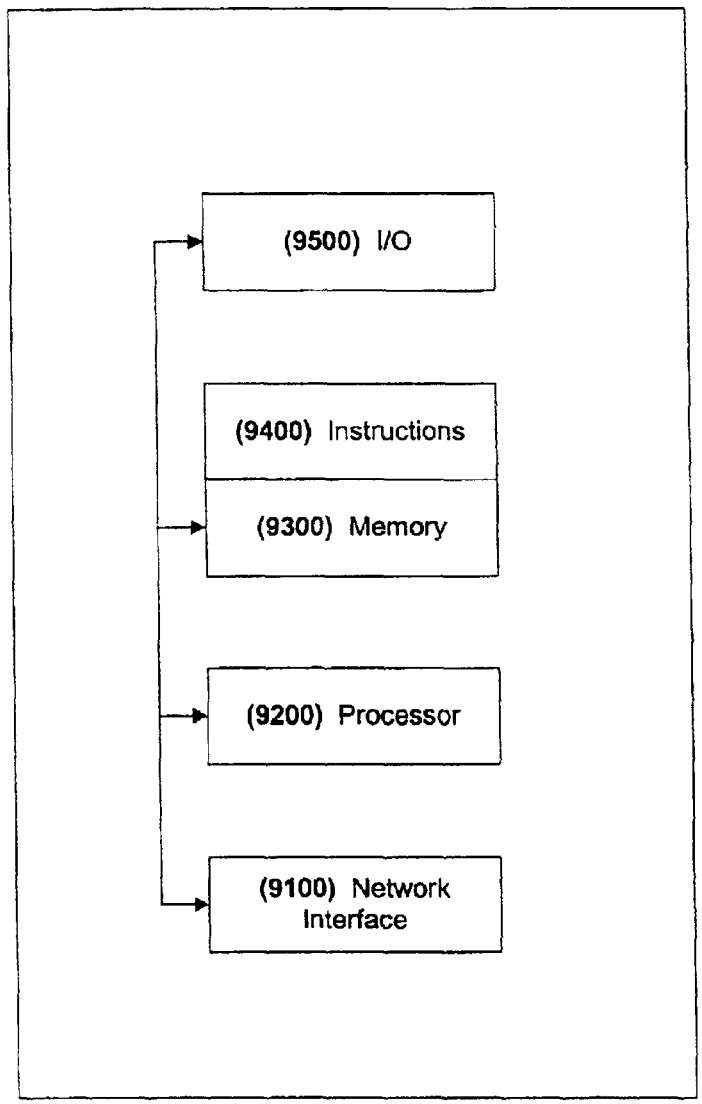
FIG. 9 is a block diagram of an embodiment of an information device 9 of the present invention.

FIG. 9 provides a block diagram of an embodiment of an information device 9 of the present invention. As an initial matter, it suffices to say that, using the description of methods 1 through 8 and 10, one of ordinary skill in the art can implement the functionality of methods 1 through 8 and 10 via information device 9 utilizing any of a wide variety of well-known architectures, hardware, protocols, and/or software. Thus, the following description of information device 9 can be viewed as illustrative, and should not be construed to limit the implementation of methods 1 through 8 or 10.

Information device 9 can include well-known components such as one or more processors 9120, one or more memories 9140 containing instructions 9160, one or more input/output (I/O) devices 9180, and one or more network interfaces 9190.

In one embodiment of information device 9, each processor 9120 can be a general purpose microprocessor, such a the Pentium series microprocessor manufactured by the Intel Corporation of Santa Clara, Calif. In another embodiment, the processor can be an Application Specific Integrated Circuit (ASIC) which has been designed to implement in its hardware and/or firmware at least a part of a method in accordance with an embodiment of the present invention.

Any memory 9140 can be coupled to a processor 9120 and can store instructions 9160 adapted to be executed by processor 9120 according to one or more actions of methods 1 through 9. Memory 9140 can be any device capable of storing analog or digital information, such as a hard disk, Random Access Memory (RAM), Read Only Memory (ROM), flash memory, a compact disk, a magnetic tape, a floppy disk, and any combination thereof.

Instructions 9160 can be embodied in software, which can take any of numerous forms that are well-known in the art. For example, information device 9 can access one or more databases having a flat file or a relational organization, and a centralized or distributed architecture. For instance, those of skill in the art can tailor items such as an SQL database to provide the functionality of methods 1 through 8 and 10. One supplier of such database items can be Oracle Corporation, of Redwood Shores, Calif. Moreover, software tools such as EDI, FTP, HTTP, HTML, XML, cXML, XSL, and WAP can be utilized for communications between information devices. Additionally, information device 9 can utilize platform-independent and/or network-centric software tools such as, for example, Java or JavaScript.

Any input/output (I/O) device 9180 can be an audio and/or visual device, including, for example, a monitor, display, keyboard, keypad, touchpad, pointing device, microphone, speaker, video camera, camera, scanner, and/or printer, including a port to which an I/O device can be attached or connected.

Any network interface 9190 can be a telephone, a traditional data modem, a fax modem, a cable modem, a digital subscriber line interface, a bridge, a hub, a router, or other similar devices.

Figure 10:
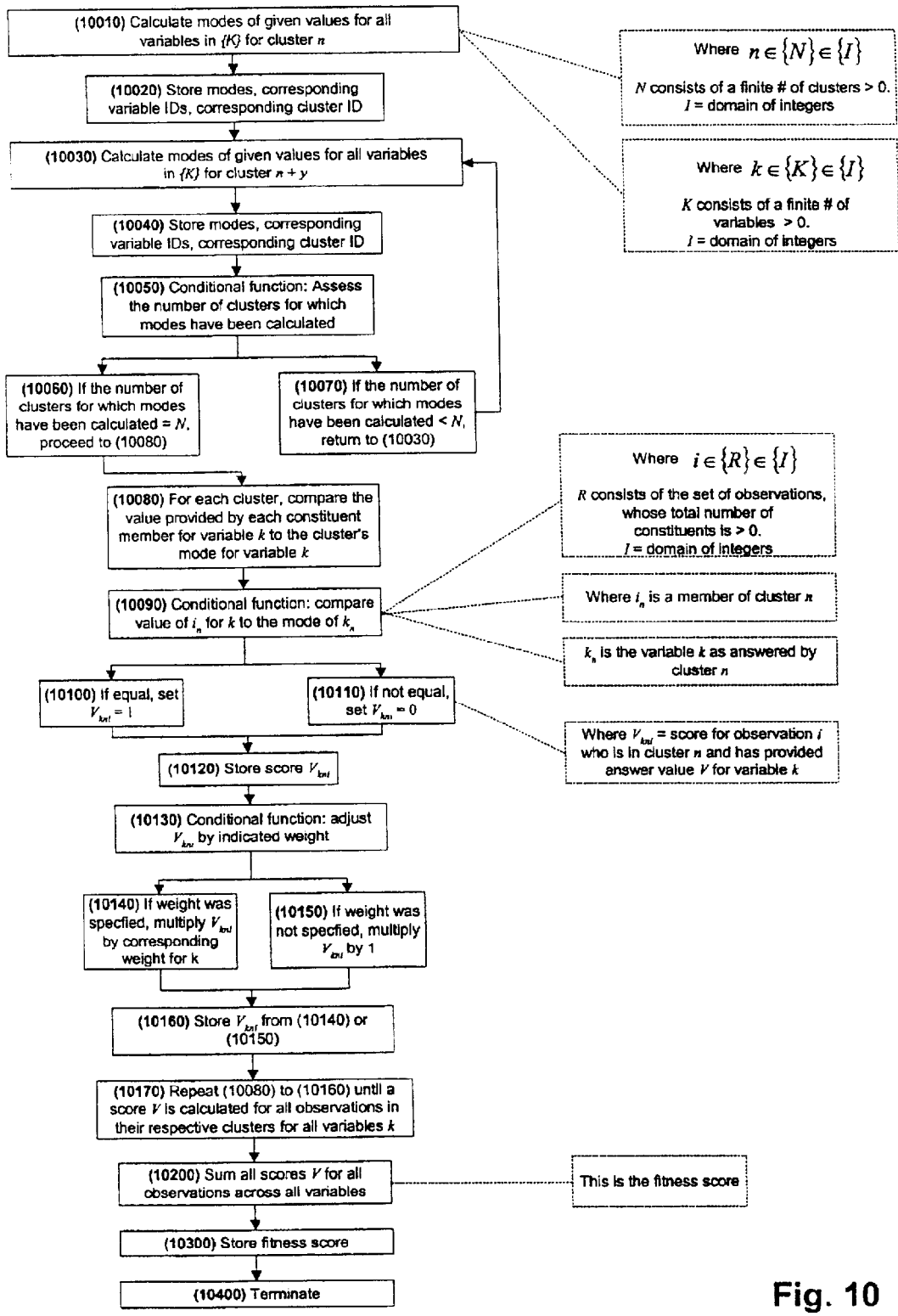
FIG. 10 is a flowchart of an exemplary embodiment of a method 10 of the present invention.

FIG. 10 is flowchart of an exemplary embodiment of a method 10 of the present invention. Method 10 is also known as the fitness score calculation technique. At activity 10010, modes of given values for all variables in {K} for cluster n are calculated, where n is an element of {N}, which is an element of {I}, and N consists of a finite, non-zero, positive number of clusters and I is the domain of integers. Also, k is an element of {K}, which is an element of {I}, and K consists of a finite, non-zero, positive number of clusters and I is the domain of integers.

At activity 10020, the modes, their corresponding variable identifications, and their corresponding cluster identifications are stored. At activity 10030, modes of given values for all variables in {K} for cluster n+y are calculated. At activity 10040, the modes, their corresponding variable identifications, and their corresponding cluster identifications are stored. At activity 10050, an assessment is made regarding the number of clusters for which modes have been calculated. At activity 10060, if the number of clusters for which modes have been calculated is equal to N, Method 10 proceeds to activity 10080. At activity 10070, if the number of clusters for which modes have been calculated is less than N, Method 10 returns to activity 10030.

At activity 10080, for each cluster, the value provided by each constituent member for variable k is compared to the cluster's mode for variable k. At activity 10090, the value of $i_n$ for k is compared to the mode of $k_n$, where i is an element of {R}, which is an element of {I}, and R consists of the set of observations, whose total number of constituents is greater than 0, and I is the domain of integers, and $i_n$ is a member of cluster n, and $k_n$ is the variable k as answered by cluster n.

At activity 10100, if the value of in for k is equal to the mode of $k_n$, $V_{kni}$ is set to 1, where $V_{kni}$ is the score for an observation i that is in cluster n and has provided answer value V for variable k. At activity 10110, if the value of $i_n$ for k is not equal to the mode of $k_n$, $V_{kni}$ is set to zero.

At activity 10120, $V_{kni}$ is stored. At activity 10130, $V_{kni}$ can be adjusted by an indicated weight. At activity 10140, if a weight was specified, $V_{kni}$ is multiplied by the corresponding weight for k. At activity 10150, if a weight was not specified, $V_{kni}$ is multiplied by 1. At activity 10160, $V_{kni}$ is stored. At activity 10170, activities 10080 to 10160 are repeated until a score of V is calculated for all observations in their respective clusters for all variables k. At activity 10200, all scores V are summed for all observations across all variables to arrive at the fitness score. At activity 10300, the fitness is stored. At activity 10400, method 10 is terminated.

Additional Embodiments

Still other advantages of the present invention will become readily apparent to those skilled in this art from the above-recited detailed description. Accordingly, the drawings and descriptions are to be regarded as illustrative in nature, and not as restrictive. For example, embodiments of Methods 1, 2, 3, 4, 5 6, 7, 8 and/or 10 of the present invention can be viewed as germane to a number of disparate disciplines beyond business and marketing. The following list outlines examples of problems in these fields that can be solved by applying one or more of the aforementioned methods.

1. Evolutionary Biology
   a. Illustrative problem(s): Taxonomy is a critical component of demonstrating biological convergence/divergence. However, this process often involves subjective comparisons of fossils and dissection results.
   b. New/improved solution(s): Embodiments of the inventions disclosed herein can be adapted to group observations of living (not currently alive but to distinguish from non-living things such as rocks or stars) specimens by using images (which are in essence transformed into numerical sequences) of the living things. This clustering will improve biologists' ability to understand which organisms were converging and diverging from one another.

2. Molecular Biology
   a. Illustrative problem(s): Understanding the biological impact of particular proteins, enzymes, genes, and other microscopic (and usually sub-cellular) entities is a time-intensive process.
   b. New/improved solution(s): Biologists will be able to leverage libraries of previously identified microscopic entities with known functions/properties in order to create high-resolution "clusters" that can be transformed into biological typing tools for rapidly classifying and describing novel microscopic entities.

3. Finance
   a. Illustrative problem(s): Understanding stock market volatility is a largely "intuitive" process; attempts at "quantitative trading" have largely ended in disaster (stock market collapses, failure of firms engaging in that activity)
   b. New/improved solution(s): Better understanding of how different industries' stock prices respond to differing market pressures; ability to analyze historical data to assemble portfolios (i.e. clusters of different stocks) optimized against a particular objective 4. Economics
   a. Illustrative problem(s): Regression analysis is useful for isolating factors that contribute to the occurrence of a phenomenon, such as changes in CPI or GDP, but is less useful for understanding macro-economic issues such whether a nation is eligible for membership to an economic group, such as Turkey into the European Union
   b. New/improved solution(s): Large-scale, high-resolution clustering and composition analysis would enable economists and policy-makers to develop quantitative decision rules for governing macro-economic dynamics 5. Politics
   a. Illustrative problem(s): Contacting a household not affiliated with a particular political party is a waste of time and resources; how to optimize media spending to enhance CPM on a political-affiliation basis; how to effectively identify centrists/undecided voters and communicate with them
   b. New/improved solution(s): Superior method for understanding polling data via high resolution clustering; ability to predict political affiliation using unobtrusive questions; ability to score media vehicles to determine which are more widely viewed by a particular constituency 6. Psychology
   a. Illustrative problem(s): Executing psychology experiments on a large scale (n≧5,000) in a normalized population is difficult without introducing too many biases into the study
   b. New/improved solution(s): Because most psychology studies involve measuring responses to stimuli, the inventors' inventions give psychologists the ability to conduct a comprehensive study on a smaller scale population and develop efficient "field tests" that only use the most predictive questions from the comprehensive study 7. Sociology
   a. Illustrative problem(s): Executing sociology studies on a large scale (n≧5,000) in a normalized population is difficult without introducing too many biases into the study
   b. New/improved solution(s): Because most sociology studies involve qualitative surveys, sociologists can conduct a comprehensive study on a smaller scale population and develop efficient "Yield tests" that only use the most predictive questions from the comprehensive study 8. Chemistry/chemical Engineering
   a. Illustrative problem(s: One of the most time-consuming aspects of chemistry research (e.g. pharmaceuticals, industrial chemicals) is determining if a newly-formed compound is chemically relevant. For example, the biggest rate-limiting step in the pharmaceutical research process (before clinical trials begin) is sorting out biologically relevant compounds from the ones that are toxic or otherwise devoid of practical application in mammalian systems.
   b. New/improved solution(s): Leverage libraries of previously identified chemicals with useful properties in order to create high-resolution "clusters" that can be transformed into chemical typing tools for rapidly classifying and describing novel chemicals.

9. Pharmaceutical Drug Development
   a. Illustrative problem(s): A difficult, time consuming, and expensive part of the drug development process is conducting clinical trials because of the difficulty in pinpointing stable populations for which the drug in question can be indicated. Failure to prove that a specific group of people exists for whom a drug can be relevant will cause the Food and Drug Administration to deny approval of that drug. This group must be a stable population that is statistically relevant.
   b. New/improved solution(s): By using inventors' Best-fit clustering invention, pharmaceutical companies will be able to rapidly identify stable, statistically relevant populations for whom the drug in question is relevant. The inventors' Segment-on-the-Fly invention will allow pharmaceutical companies to accurately find members of the target population for clinical testing.

10. Astrophysics/astronomy
    a. Illustrative problem(s): Neural nets are currently used to describe/classify newly discovered heavenly bodies. Unfortunately, neural networks are blackbox systems that cannot be modified once they initiate analysis.
    b. New/improved solution(s): Because the inventors' inventions are not neural networks, they can accomplish the same objectives in faster cycle times with the added flexibility of adding/removing data mid-process. Furthermore, astronomical typing tools for different classes of space-borne objects can be created to accelerate identification cycles in the field.

11. Linguistics
    a. Illustrative problem(s): Historical linguistics employs basic statistical tools and "logic-based intuition" to understand the evolution (both convergence and divergence) of different language groups; unfortunately linguists have not been able to definitely answer pressing questions such as whether or not genetic relationships among languages (e.g. hypothesis of Japanese as an Altaic language) are actual or serendipitous.

b. New/improved solution(s): Because the essence of linguistics is discovering patterns/clusters of grammar/syntax/lexicon and understanding distances among groups of languages, the inventors' innovations in clustering and composition analysis are well-suited to quantitatively proving genetic relationships among languages.

12. Medicine
  a. Illustrative problem(s): Although medicine is a blend of art and science, there is an over-reliance on intuition and experience in diagnosing patients. Consequently, there is substantial room for initial misdiagnoses, which result in lost time and compromised treatment.
  b. New/improved solution(s): Because much of medicine relies upon case histories and experience, the inventors' inventions can be easily adapted to create segmentation structures of different therapeutic areas and develop diagnostic "disease/ailment typing tools" for use in patient interviews. The inventors screener would help to narrow the number of possibilities doctors would need to consider when examining a patient.

13. Anthropology
  a. Illustrative problem(s): Like its social sciences brethren, anthropology has historically relied upon largely a priori interpretations of observed data, in this case human behaviors/cultural phenomena.
  b. New/improved solution(s): By using the inventors' inventions to create high-resolution clustering structures of recorded human behaviors/cultural phenomena, anthropologists can quantitatively establish the similarity/dissimilarity of sundry human societies and trace convergence/divergence in socialization patterns.

This list is by no means exhaustive (in overall scope of applicable disciplines nor in the applications to specific disciplines) but is meant to demonstrate the potential universality of embodiments of methods 1, 2, 3, 4, 5, 6, 7, 8 and/or 10.

What is claimed is:

1. A computer-assisted method for determining a plurality of clusters, comprising the activities of:
   for each of a plurality of observations, obtaining a data set containing no more than one proxy value for each of a plurality of variables, each variable having a plurality of possible values;
   assigning each of the plurality of observations to one of a plurality of clusters; and
   for the plurality of observations and the plurality of variables, via cluster reassignment, maximizing a processor-determined fitness score representing a number of variables from the plurality of variables for which each observation's proxy value corresponds to a mode for that observation's assigned cluster.

2. The method of claim 1, wherein the proxy value represents a single provided value.

3. The method of claim 1, further comprising transforming a plurality of provided values for a particular variable into a single proxy value.

4. The method of claim 1, further comprising transforming a single provided value for a particular variable into a single proxy value.

5. The method of claim 1, further comprising transforming a single provided continuous value to a particular continuous variable into a single categorical proxy value.

6. The method of claim 1, wherein a portion of the data set can be bias-free.

7. The method of claim 1, wherein a portion of the data set can be obtained from a panel that objectively measures behaviors.

8. The method of claim 1, further comprising calculating the fitness score.

9. The method of claim 1, further comprising calculating the fitness score by activities comprising:
   a) calculating modes of proxy values for each variable for all observations associated with each cluster;
   b) for each variable, conditional upon a proxy value equaling a mode for a cluster, assigning a value of 1 to a sub-score and multiplying an assigned value by a specified weight for the corresponding question if a weight was specified;
   c) for each observation, summing the sub-scores for all variables to obtain an observation fitness score;
   d) summing all observation fitness scores to obtain a fitness score.

10. The method of claim 1, further comprising calculating the fitness score by activities comprising:
    a) calculating modes of proxy values for each variable for all observations associated with each cluster;
    b) for each variable, conditional upon a proxy value equaling a mode for a cluster, assigning a value of 1 to a sub-score, and conditional upon a proxy value not equaling a mode for a cluster, assigning a value of 0 to the sub-score and multiplying an assigned value by a specified weight for the corresponding question if a weight was specified;
    c) for each observation, summing the sub-scores for all variables to obtain an observation fitness score;
    d) summing all observation fitness scores to obtain a fitness score.

11. The method of claim 1, further comprising modifying the data set by adding and/or subtracting observations and/or variables to improve the fitness score.

12. The method of claim 1, further comprising specifying an initial number of clusters.

13. The method of claim 1, further comprising adding a cluster to the plurality of clusters.

14. The method of claim 1, further comprising removing a cluster from the plurality of clusters.

15. The method of claim 1, further comprising obtaining a maximum number of iterations via which to arrive at a plurality of final cluster assignments that maximize fitness score.

16. The method of claim 1, further comprising identifying a maximum number of iterations to arrive at a plurality of final cluster assignments that maximize fitness score.

17. The method of claim 1, further comprising obtaining a weight to assign to a variable from the plurality of variables.

18. The method of claim 1, further comprising identifying a weight to assign to a variable from the plurality of variables.

19. The method of claim 1, further comprising re-assigning an observation to a different cluster from the plurality of clusters.

20. The method of claim 1, further comprising changing the assigned cluster for a predetermined fraction of the plurality of observations.

21. The method of claim 1, further comprising changing the assigned cluster for a predetermined fraction of the plurality of observations, said fraction including an equal number of randomly chosen observations from each of the plurality of clusters.

22. The method of claim 1, further comprising randomly changing the assigned cluster for an observation and calculating a new fitness score.

23. The method of claim 1, further comprising the activities of:
   a) changing the assigned cluster for a predetermined fraction of the plurality of observations, said fraction including an equal number of randomly chosen observations from each of the plurality of clusters;
   b) randomly changing the assigned cluster for an observation and calculating a new fitness score; and
   c) repeating activities a) and b) until cluster assignments are identified for all respondents that maximize fitness score.

24. The method of claim 1, further comprising employing linear optimization during the activities of:
   a) changing the assigned cluster for a predetermined fraction of the plurality of observations, said fraction including an equal number of randomly chosen observations from each of the plurality of clusters;
   b) randomly changing the assigned cluster for an observation and calculating a new fitness score; and
   c) repeating activities a) and b) until cluster assignments are identified for all respondents that maximize fitness score.

25. The method of claim 1, wherein each of the plurality of observations can be initially assigned to a predetermined one of the plurality of clusters.

26. The method of claim 1, wherein each of the plurality of observations can be initially randomly assigned to one of the plurality of clusters.

27. The method of claim 1, further comprising identifying initial cluster assignments for each of the plurality of observations.

28. The method of claim 1, further comprising obtaining predetermined initial cluster assignments for each of the plurality of observations.

29. The method of claim 1, further comprising:
   obtaining predetermined initial cluster assignments for each of the plurality of observations; and
   modifying the data set by adding and/or subtracting observations and/or variables to improve the fitness score.

30. The method of claim 1, further comprising obtaining predetermined initial cluster assignments for each of the plurality of observations, the initial cluster assignments determined by at least one prior application of claim 1.

31. The method of claim 1, further comprising obtaining predetermined initial cluster assignments for each of the plurality of observations, the initial cluster assignments determined by a plurality of prior applications of claim 1.

32. The method of claim 1, further comprising obtaining predetermined initial cluster assignments for each of the plurality of observations, the initial cluster assignments determined by iterative applications of claim 1.

33. The method of claim 1, further comprising identifying initial cluster assignments for each of the plurality of observations, the initial cluster assignments a result of a systematic search.

34. The method of claim 1, further comprising determining initial cluster assignments for each of the plurality of observations.

35. The method of claim 1, further comprising identifying initial cluster assignments for each of the plurality of observations by the activities comprising:
   identifying a pair of variables that creates a first clustering solution that maximizes the fitness score using a specified number of clusters;
   determining a first single variable that creates a second clustering solution that maximizes the fitness score using the specified number of clusters;
   holding the first single variable constant, determining a second single variable that, in tandem, creates a third clustering solution that maximizes the fitness score using the specified number of clusters.

36. The method of claim 1, further comprising identifying initial cluster assignments for each of the plurality of observations by activities comprising:
   a) identifying any pair of variables that together creates a first clustering solution that maximizes the fitness score using a specified number of clusters;
   b) determining a first single variable that creates a second clustering solution that maximizes the fitness score using the specified number of clusters;
   c) holding the first single variable constant, determining a second single variable that, in tandem, creates a third clustering solution that maximizes the fitness score using the specified number of clusters;
   d) holding the second single variable constant, determining a third single variable that, in tandem with the second single variable, creates a fourth clustering solution that maximizes the fitness score using the specified number of clusters;
   e) repeating activities c) and d) by cycling through all possible combinations of variable pairings until fitness score as calculated in activity d) can be maximized.

37. A computer-readable medium containing instructions for activities comprising:
   for each of a plurality of observations, obtaining a data set containing no more than one proxy value for each of a plurality of variables, each variable having a plurality of possible values;
   assigning each of the plurality of observations to one of a plurality of clusters; and
   for the plurality of observations and the plurality of variables, via cluster reassignment, maximizing a processor-determined fitness score representing a number of variables from the plurality of variables for which each observation's proxy value corresponds to a mode for that observation's assigned cluster.

38. An apparatus for determining a plurality of clusters, comprising:
   for each of a plurality of observations, means for obtaining a data set containing no more than one proxy value for each of a plurality of variables, each variable having a plurality of possible values;
   means for assigning each of the plurality of observations to one of a plurality of clusters; and
   for the plurality of observations and the plurality of variables, via cluster reassignment, means for maximizing a processor-determined fitness score representing a number of variables from the plurality of variables for which each observation's proxy value corresponds to a mode for that observation's assigned cluster.

* * * * *